US009736816B2

(12) United States Patent
Pelletier et al.

(10) Patent No.: US 9,736,816 B2
(45) Date of Patent: Aug. 15, 2017

(54) METHOD FOR TRANSMISSION OF AN E-DCH CONTROL CHANNEL IN MIMO OPERATIONS

(71) Applicant: INTERDIGITAL PATENT HOLDINGS, INC., Wilmington, DE (US)

(72) Inventors: Benoit Pelletier, Roxboro (CA); Diana Pani, Montreal (CA); Lujing Cai, Morganville, NJ (US); Damian C. Hamme, Horsham, PA (US); Joseph S. Levy, Merrick, NY (US); Chao-Cheng Tu, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/751,228

(22) Filed: Jan. 28, 2013

(65) Prior Publication Data

US 2013/0195044 A1    Aug. 1, 2013

Related U.S. Application Data

(60) Provisional application No. 61/591,840, filed on Jan. 27, 2012, provisional application No. 61/611,927, (Continued)

(51) Int. Cl.
*H04W 4/00* (2009.01)
*H04W 72/04* (2009.01)
(Continued)

(52) U.S. Cl.
CPC .......... *H04W 72/04* (2013.01); *H04B 7/0404* (2013.01); *H04L 25/03923* (2013.01); *H04B 7/063* (2013.01)

(58) Field of Classification Search
None
See application file for complete search history.

(56) References Cited

U.S. PATENT DOCUMENTS 7,711,365 B2    5/2010  Nakamata
2007/0041342 A1*  2/2007  Usuda et al. ................ 370/329
(Continued)

FOREIGN PATENT DOCUMENTS

CN    101207426 A    6/2008
CN    102246572 A    11/2011
(Continued)

OTHER PUBLICATIONS

3rd Generation Partnership Project (3GPP), RP-101432, "SI proposal for Uplink MIMO", QUALCOMM Incorporated, 3GPP TSG-RAN, Meeting #50, Istanbul, Turkey, Dec. 7-10, 2010, 6 pages.
(Continued)

*Primary Examiner* — Kibrom T Hailu
(74) *Attorney, Agent, or Firm* — Condo Roccia Koptiw LLP

(57) ABSTRACT

Systems, methods, and instrumentalities are disclosed for a wireless transmit/receive unit (WTRU) to determine rank, offset, or inter-stream interference control information, for example, which may be associated with uplink MIMO operations. A method to control a WTRU may include receiving a special E-RNTI that is associated with a channel. The channel may be associated with a rank indication. The channel may be an E-AGCH-like channel. The channel may have a similar encoding structure as an E-AGCH. The channel may be an E-ROCH. The channel may be received, and it may be determined that the channel is associated with the special E-RNTI. At least one of a rank or an offset may be determined, and the WTRU may be configured with the determined rank or offset. An inter-stream interference (ISI) offset may be received, for example, via RRC signaling, and
(Continued)

may be applied to an uplink transmission of a primary stream.

22 Claims, 11 Drawing Sheets

Related U.S. Application Data filed on Mar. 16, 2012, provisional application No. 61/641,796, filed on May 2, 2012, provisional application No. 61/644,506, filed on May 9, 2012.

(51) Int. Cl.
*H04B 7/0404* (2017.01)
*H04L 25/03* (2006.01)
*H04B 7/06* (2006.01)

(56) References Cited

U.S. PATENT DOCUMENTS

| | | | |
|---|---|---|---|
| 2007/0042785 A1* | 2/2007 | Nakamata | 455/450 |
| 2007/0064708 A1* | 3/2007 | Usuda et al. | 370/394 |
| 2009/0186624 A1* | 7/2009 | Cave et al. | 455/450 |
| 2010/0130219 A1* | 5/2010 | Cave et al. | 455/450 |
| 2010/0323743 A1* | 12/2010 | Huan | 455/522 |
| 2011/0080972 A1 | 4/2011 | Xi et al. | |
| 2011/0110337 A1* | 5/2011 | Grant | H04B 1/707 370/335 |
| 2011/0263281 A1 | 10/2011 | Cai et al. | |
| 2011/0292917 A1 | 12/2011 | Fan et al. | |
| 2011/0312317 A1* | 12/2011 | Sahin et al. | 455/422.1 |
| 2012/0124263 A1* | 5/2012 | Zhou et al. | 710/240 |
| 2012/0287868 A1* | 11/2012 | Sambhwani et al. | 370/329 |
| 2012/0287965 A1* | 11/2012 | Sambhwani et al. | 375/141 |
| 2013/0114425 A1* | 5/2013 | Sayana et al. | 370/252 |
| 2013/0121312 A1* | 5/2013 | Roman et al. | 370/335 |
| 2013/0195044 A1 | 8/2013 | Pelletier et al. | |

FOREIGN PATENT DOCUMENTS

| | | |
|---|---|---|
| EP | 2807757 A1 | 12/2014 |
| JP | 2010-537471 A | 12/2010 |
| JP | 2012-510237 A | 4/2012 |
| JP | 2013-511168 A | 3/2013 |
| JP | 2013-530560 A | 7/2013 |
| KR | 10-2008-0036233 | 4/2008 |
| WO | WO 2009-022873 A2 | 2/2009 |
| WO | WO 2010-068487 A1 | 6/2010 |
| WO | WO 2011-041492 A2 | 4/2011 |
| WO | WO 2011-127358 A1 | 10/2011 |
| WO | WO 2011-128314 A1 | 10/2011 |
| WO | WO 2013/112805 A1 | 8/2013 |

OTHER PUBLICATIONS

3rd Generation Partnership Project (3GPP), RP-111642, "MIMO with 64QAM for HSUPA", Nokia Siemens Networks, 3GPP TSG-RAN, Meeting #54, Berlin, Germany, Dec. 6-9, 2011, 6 pages.
3rd Generation Partnership Project (3GPP), TS 25.321, V10.5.0, "3rd Generation Partnership Project; Technical Specification Group Radio Access Network;" Medium Access Control (MAC) protocol specification Release 10, Dec. 2011, 181 pages.
$3^{rd}$ Generation Partnership Project (3GPP), TS 25.212, V10.1.0, "3rd Generation Partnership Project; Technical Specification Group Radio Access Network;" Multiplexing and channel coding (FDD) Release 10, Dec. 2010, 116 pages.
$3^{rd}$ Generation Partnership Project (3GPP), TS 25.214, V10.5.0, "3rd Generation Partnership Project; Technical Specification Group Radio Access Network;" Physical layer procedures (FDD Release 10, Dec. 2011, 100 pages.
E. Dahlman, S. Parkvall, J. Sköld, and P. Beming, 3G Evolution—HSPA and LTE for Mobile Broadband, First Edition, Academic Press, 2007, 485 pages.
$3^{rd}$ Generation Partnership Project, (3GPP), R2-120662, "Downlink Grant Channel Design for UL MIMO", Nokia Siemens Networks, 3GPP TSG-RAN, Dresden, Feb. 6-10, 2012, 4 pages.

\* cited by examiner

METHOD FOR TRANSMISSION OF AN E-DCH CONTROL CHANNEL IN MIMO OPERATIONS

CROSS REFERENCE TO RELATED APPLICATION

This application is claims the benefit of U.S. provisional application Nos. 61/591,840 filed Jan. 27, 2012, 61/611,927 filed Mar. 16, 2012, 61/641,796 filed May 2, 2012, 61/644,506 filed May 9, 2012, each of which is incorporated by reference as if fully set forth.

BACKGROUND

The evolution of the UMTS WCDMA standards on the uplink has lagged in the past with respect to downlink transmission. Indeed, the required data transmission on the downlink is usually assumed to be larger for users than the transmission in the uplink direction. There are many problems relating to dual-stream operations on the uplink.

SUMMARY

Systems, methods, and instrumentalities are disclosed for a wireless transmit/receive unit (WTRU) to determine rank, offset, and/or inter-stream interference control information, for example, which may be associated with uplink multiple-input and multiple-output (MIMO) operations. A WTRU may include a processor that may be configured to receive a special E-RNTI. The special E-RNTI may be associated with a channel. The channel may be associated with a rank indication. The channel may be an E-AGCH-like channel. For example, the E-AGCH-like channel may be an E-ROCH.

Encoding of the E-AGCH-like channel may be related to E-AGCH encoding. For example, the E-AGCH-like channel may have the same encoding chain as an E-AGCH.

The processor may be configured to receive the channel and determine that the channel is associated with the special E-RNTI. The processor may be configured to determine at least one of a rank or an offset. The rank may indicate a maximum allowable number of MIMO layers. A transport block size of a secondary stream of a dual-stream transmission maybe determined using the offset. The processor may be further configured to configure the WTRU with the determined rank or offset.

The processor may be configured to decode the channel to determine that the channel is associated with the special E-RNTI. For example, the processor may be configured to decode the channel, perform a cyclic redundancy check (CRC) on the decoded channel utilizing the special E-RNTI, and determine that the channel is associated with the special E-RNTI.

The processor may be further configured to receive an inter-stream interference (ISI) offset, for example, via RRC signaling. The processor may be further configured to apply the ISI offset to an uplink transmission of a primary stream of a dual-stream transmission.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
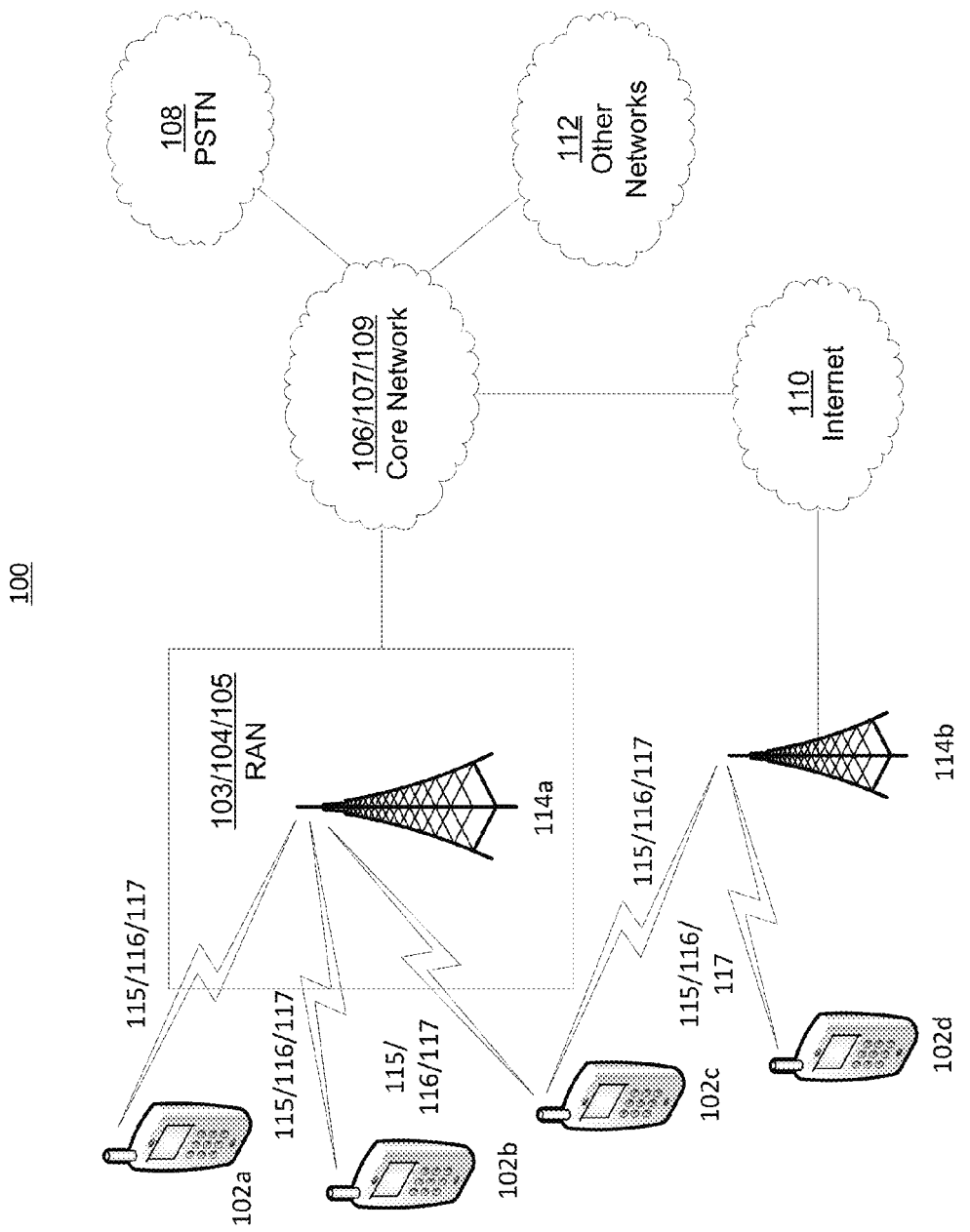
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
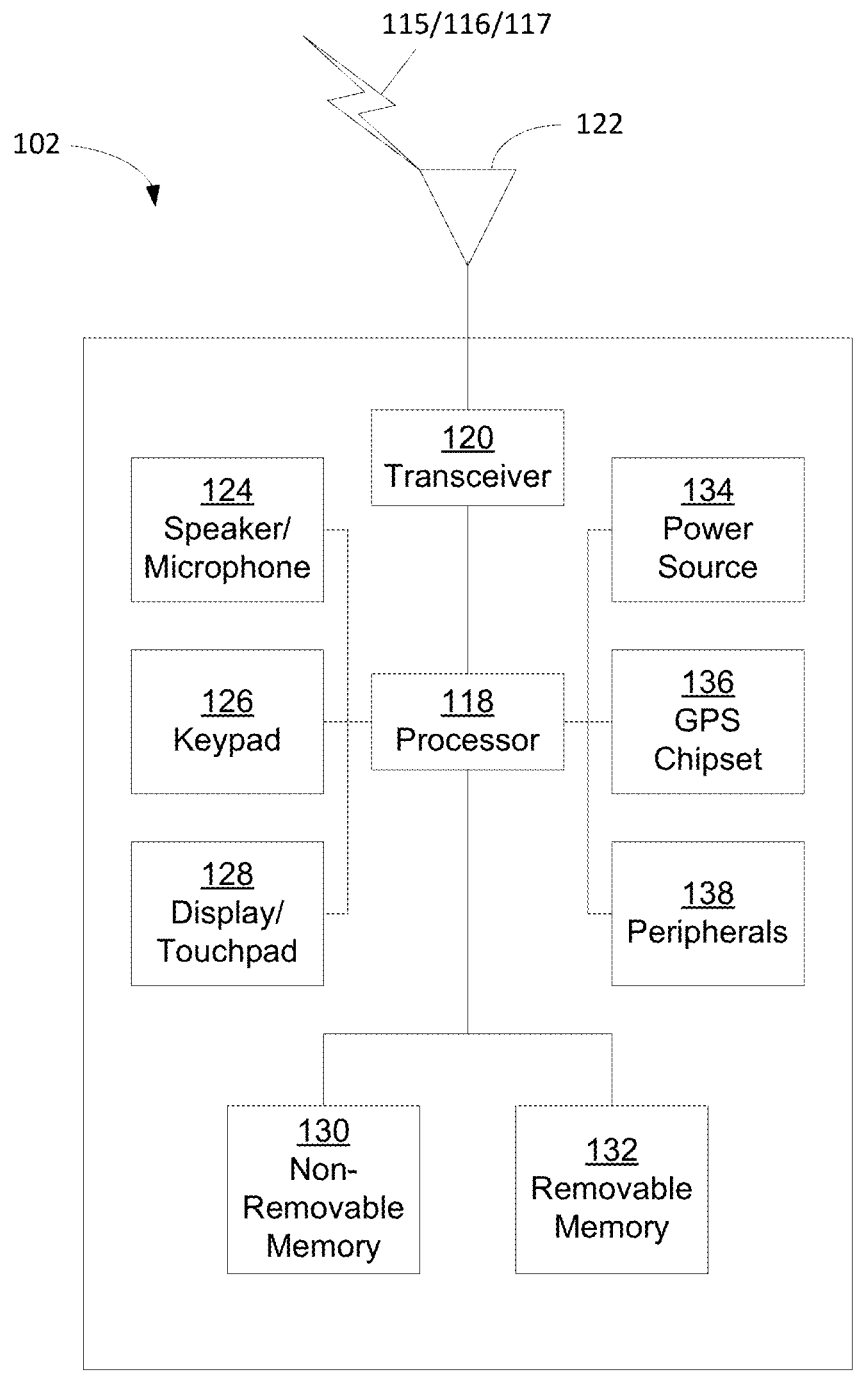
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
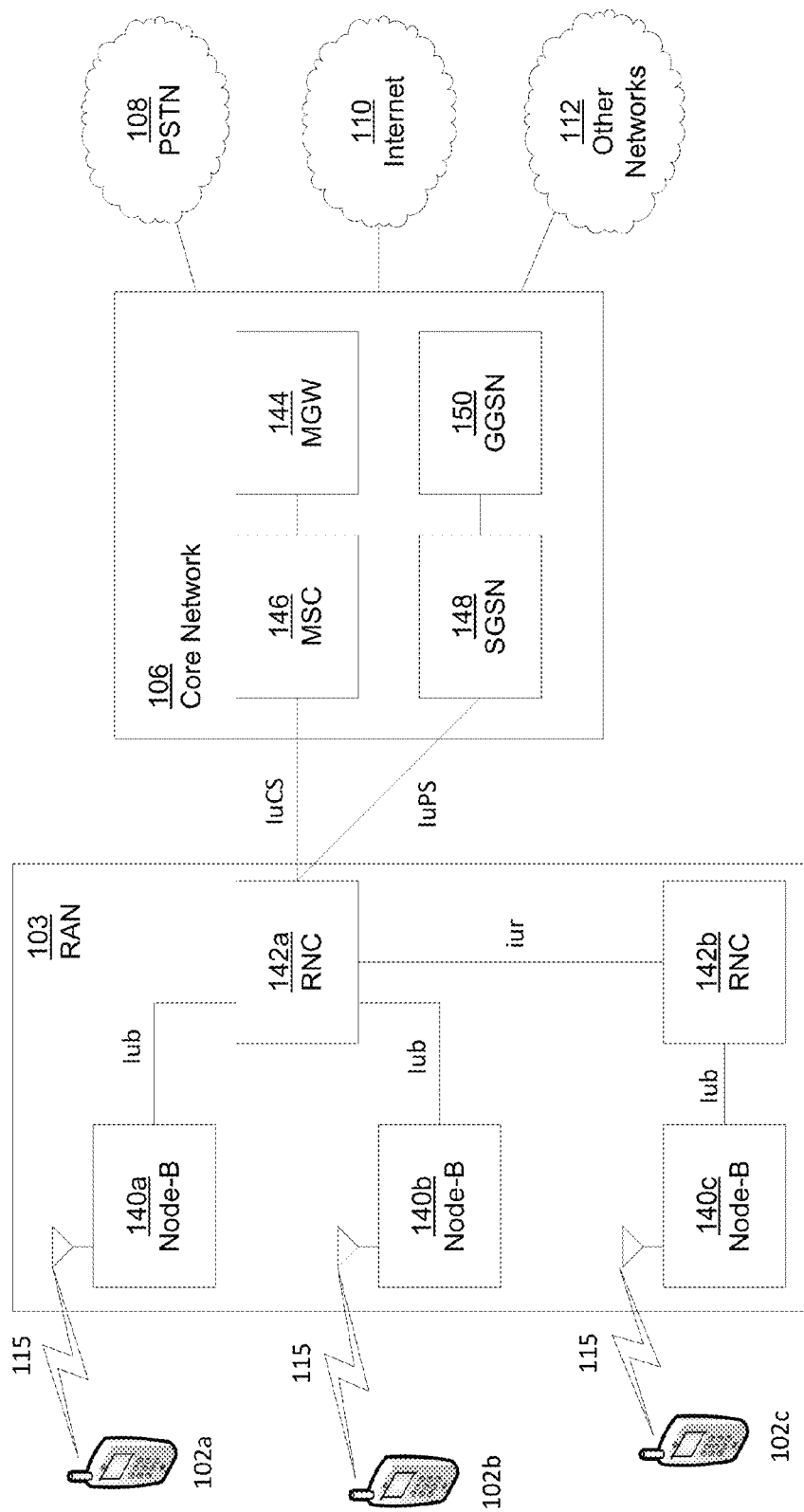
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
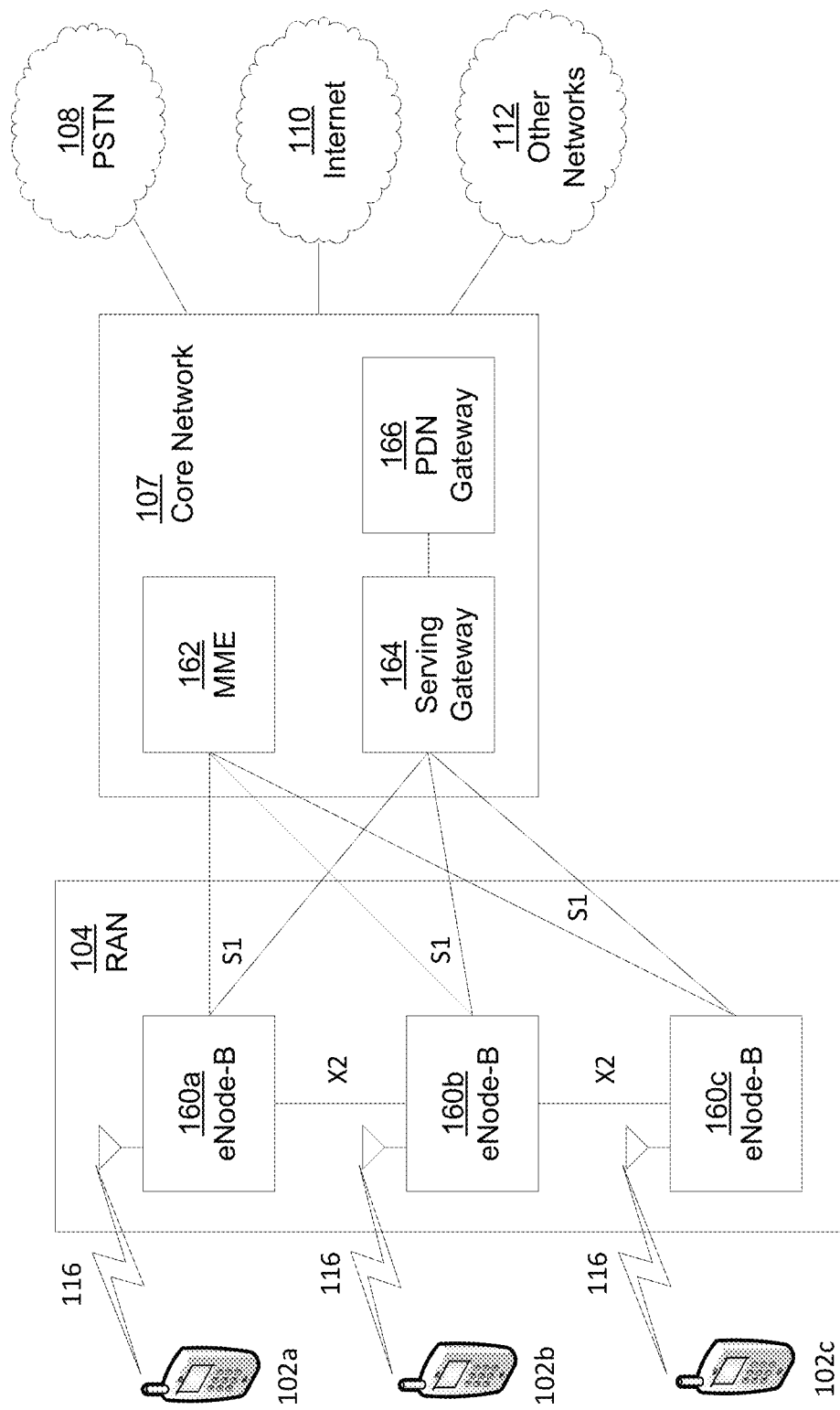
FIG. 1D is a system diagram of another example radio access network and an example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
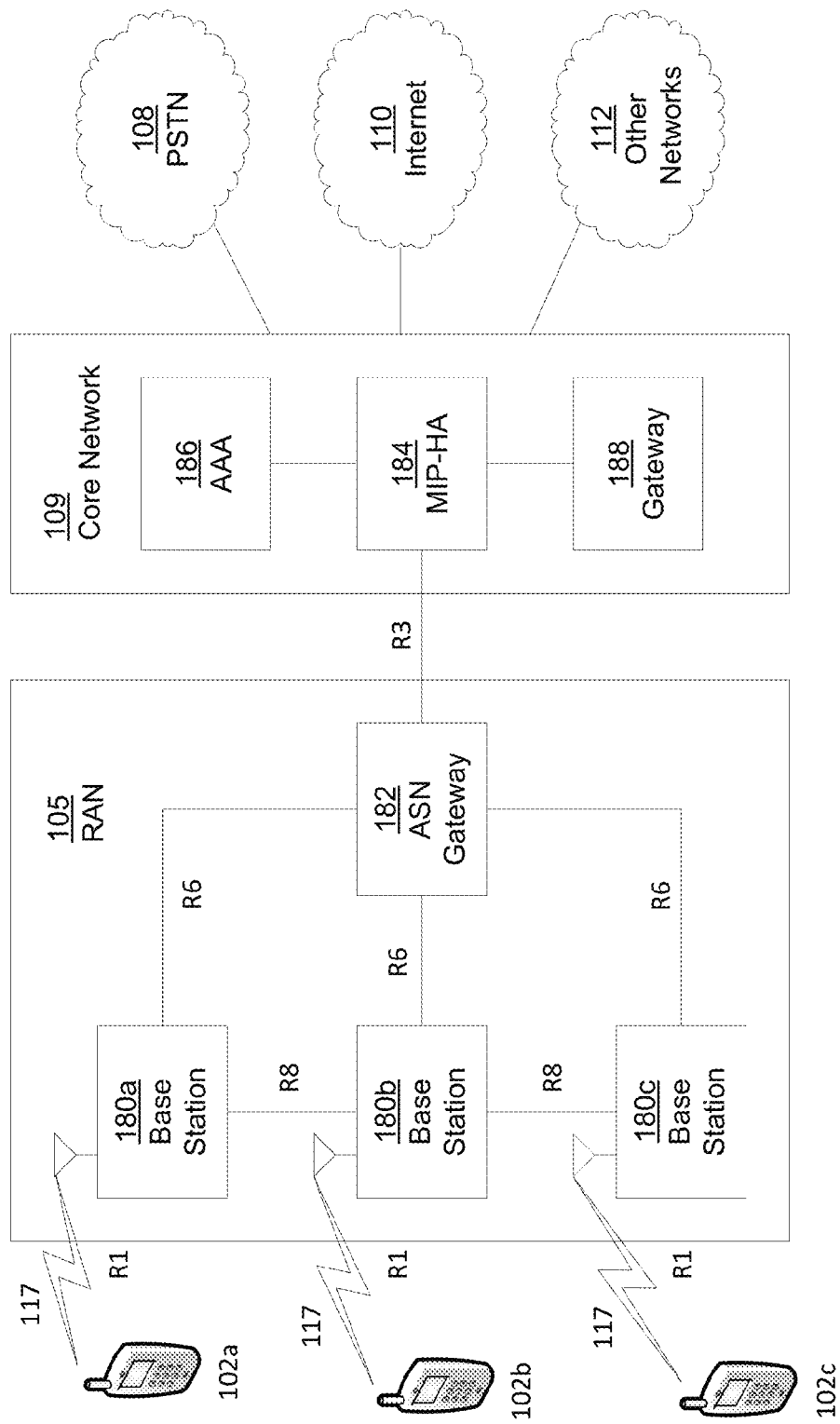
FIG. 1E is a system diagram of another example radio access network and an example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Versions of the UMTS WCDMA specifications may not provide means for multiple stream operations in the uplink (e.g., for E-DCH operations), as the specifications may relate to single stream operations. In MIMO systems, the quality of each layer or stream may differ on a subframe-by-subframe basis depending on channel realisation. The information on the channel (e.g., channel state information—CSI) may be available at the receiver, for example a NodeB, via channel estimation. The WTRU may adapt its transmission rate and/or power according to the channel conditions, e.g., to take advantage of dual-layer transmission. Since the CSI may be at the NodeB, mechanisms to control the WTRU transmission parameters with respect to dual-stream operations may be provided.

Systems, methods, and instrumentalities are disclosed that may control the WTRU rank, secondary stream data rate, and/or power. These may be described in the context of dual-transport block operations, however, the methods may be applicable to single-transport block operations.

Controlling the transmission parameters of a WTRU configured for dual-stream operations may be disclosed. The dual-stream operations transmission parameters may refer to one or more of, but may not be limited to, the rank, secondary stream power, secondary stream power offset, secondary stream rate, etc.

The WTRU may be configured semi-statically or dynamically with a specific transmission rank (e.g. via a transmission rank indication). The transmission rank may correspond to the number of MIMO layers used by the WTRU. The rank may be an absolute rank, e.g., forcing the WTRU to use that value for transmission, or may represent a maximum allowed rank, e.g., such that they WTRU may use a lower rank under specific conditions.

Systems, methods, and instrumentalities for the WTRU to receive transmit rank indications (TRI) from the NodeB may be disclosed. The TRI may control the transmission rank of the WTRU. The WTRU may be configured to receive periodic TRI from its E-DCH serving cell (e.g., the NodeB controlling the E-DCH). The WTRU may receive the transmit rank indication periodically, for example, from a physical layer channel.

The WTRU may receive the periodic transmit rank indication via a new physical channel. For example, the WTRU may receive the transmit rank indication (TRI) via a physical channel, for example, based on the F-DPCH or F-TPICH. The WTRU may receive the periodic transmit rank indication via a physical channel based on the E-HICH/E-RGCH structure.

The WTRU may be configured by the network (e.g., via a NodeB) with parameters controlling periodicity, for example parameters controlling one or more of the following: periodicity, transmission schedule; or physical channel resource (e.g., channelization code, symbol, offset, signature, etc.).

The WTRU may be configured to receive aperiodic transmit rank indication from its E-DCH serving cell. The transmit rank indication may be received by the WTRU via a dedicated physical channel. For example, the WTRU may be configured to monitor an E-RGCH/E-HICH like channel. The WTRU may detect the presence of a transmit rank indication on the configured resource and then apply the transmit parameter.

The WTRU may be configured to receive transmit rank indication commands from non-serving cells. In such cases, the WTRU may be limited to a configuration to receive "rank-1" indications. This approach may allow a non-serving cell to control the amount of interference it receives from WTRUs controlled by neighbor cells.

The transmit rank indication (TRI) may be received by the WTRU via a shared channel. For example, the WTRU may receive a transmit rank indication via a modified E-AGCH or via an E-AGCH-like channel (e.g., a new channel that may be similar to the E-AGCH, for example, the E-AGCH-like channel may have an E-AGCH-like channel structure that is similar to the channel structure of the E-AGCH). The E-AGCH-like channel may be used to transmit control information for dual-stream transmission. For example, the WTRU may receive the transmit rank indication via the E-AGCH-like channel, e.g., using the E-AGCH-like channel structure. The E-AGCH-like channel may be an E-ROCH. The E-ROCH may be utilized to transmit rank indication and/or offset information to a WTRU for dual-stream transmission.

The E-AGCH-like channel structure may be similar to the structure of the E-AGCH. For example, encoding of the E-AGCH-like channel may be related to E-AGCH encoding. The E-AGCH-like channel may have a similar encoding structure as an E-AGCH channel. For example, the E-AGCH-like channel may have a similar encoding chain (e.g., same number of bits, etc.) as an E-AGCH, but the fields may be different. The fields of the E-AGCH-like channel may include secondary stream parameters, such as but not limited to, the transmit rank indicator, secondary stream power, secondary stream power offset, secondary stream rate, etc.

The E-AGCH-like channel structure may be similar to the structure of the E-AGCH. For example, the E-AGCH-like channel may be encoded using a similar coding procedure as the E-AGCH. Information bits in the E-AGCH-like channel fields may be multiplexed. A CRC may be calculated and appended to the data (e.g., after multiplexing). The CRC may further be masked (or X-ORed) with the special E-RNTI value. The result may be encoded using a rate 1/3 convolution encoder and rate-matched to the number of bits associated with the E-AGCH-like channel (e.g., some coded bits may be punctured or not transmitted). The resulting coded bits may be transmitted. The WTRU may be configured to decode the E-AGCH-like channel, which may follow an inverse procedure; or, a procedure similar to the procedure associated to decoding of the E-AGCH channel.

The WTRU may receive the transmit rank indication from the E-AGCH-like channel. The WTRU may monitor the E-AGCH-like channel (e.g., on the configured code). The WTRU may decode the E-AGCH-like channel to determine the transmit rank indication and/or offset information, for example, for the secondary stream of a dual-stream transmission. The WTRU may apply the decoded transmit rank indication and/or offset information, for example, when it detects its identity (e.g., E-RNTI, special E-RNTI, or other configured identity) on the E-AGCH-like channel.

The offset may refer to a secondary stream offset for the secondary stream of a dual-stream transmission. For example, the offset may relate to a transport block size (TBS) of a secondary stream of a dual-stream transmission. The offset may relate to the serving grant or power offset of the secondary stream E-DPDCH of a dual-stream transmission The WTRU may receive the secondary stream offset via the E-AGCH-like channel. The WTRU may change the amount of data that may be sent on the secondary stream of a dual-stream transmission utilizing the secondary stream offset. For example, the WTRU may increase or decrease the number of bits that may be transmitted via the secondary stream (e.g., independently of the serving grant). The secondary stream offset may be used, for example, to compensate for secondary stream degradation.

Figure 2:
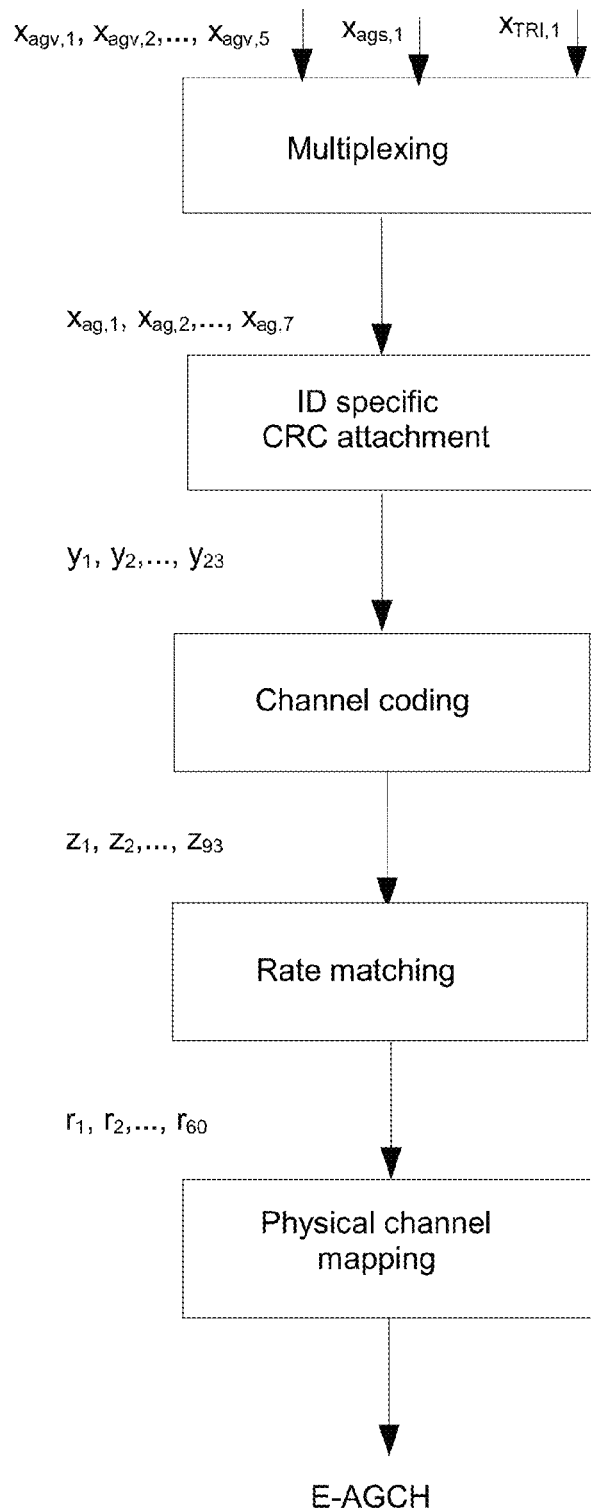
FIG. 2 illustrates example E-AGCH coding with TRI.

The transmit rank indication may be carried on an extended E-AGCH channel. An additional TRI field may be multiplexed along the other fields of the E-AGCH. FIG. 2 illustrates an exemplary extended E-AGCH coding with TRI.

Additional puncturing may be carried out in the rate matching block, e.g., to account for the additional control channel load. In the example of FIG. 2, the additional control bit leads to an extra 3 coded bits to be punctured. The actual coded bits to puncture may be determined, for instance, via simulations. The WTRU may decode the extended E-AGCH by taking into considerations the new puncturing and the new TRI field.

The WTRU may re-interpret a field of the E-AGCH (e.g., thereby establishing a modified E-AGCH) to determine the value of the transmit rank indication. The modified E-AGCH may include the E-AGCH, but a WTRU may interpret the bits of the modified E-AGCH differently. The WTRU may differentiae the E-AGCH from the modified E-AGCH, for example, according to the configuration of the WTRU (e.g., when the WTRU is configured for UL MIMO operations, the WTRU may interpret the fields of the E-AGCH as those of a modified E-AGCH). Re-interpreting a field of the E-AGCH to determine the value of the transmit rank indication may be achieved, for example, using one or more of the following.

The WTRU may be configured with a fixed absolute grant scope when UL MIMO operations are configured. The value of the absolute grant scope may be configured by the network or fixed in the specifications (e.g., to value "Per HARQ process" or "All HARQ processes"). The WTRU may be further configured to re-interpret the value of the Absolute Grant Scope bit in the extended E-AGCH as an explicit transmit rank indication (TRI).

The WTRU may be configured with a new absolute grant mapping table comprising a new special value (e.g., RANK CONTROL). Upon reception of the RANK CONTROL value for the absolute grant, the WTRU may interpret the value carried in the Absolute Grant Scope field as an explicit TRI.

The WTRU may be configured with an absolute grant mapping table for which each entry may be associated to a rank. The WTRU may derive the value of the rank upon reception of the modified E-AGCH by looking in the table at the row indicated by the Absolute Grant Value index. Table 1 is an example illustrating the concept, where a new row indicating the rank has been added to a Mapping of an Absolute Grant Value table (e.g., values and number of entries in Table 1 are examples).

TABLE 1

Example Mapping of Absolute Grant Value
(e.g., with no grant repetition)

| Absolute Grant Value | Rank | Index |
|---|---|---|
| $(168/15)^2 \times 6$ | 2 | 31 |
| $(150/15)^2 \times 6$ | 2 | 30 |
| $(168/15)^2 \times 4$ | 2 | 29 |
| $(150/15)^2 \times 4$ | 2 | 28 |
| $(134/15)^2 \times 4$ | 2 | 27 |
| $(119/15)^2 \times 4$ | 2 | 26 |
| $(150/15)^2 \times 2$ | 1 | 25 |
| $(95/15)^2 \times 4$ | 1 | 24 |
| $(168/15)^2$ | 1 | 23 |
| $(150/15)^2$ | 1 | 22 |
| $(134/15)^2$ | 1 | 21 |
| $(119/15)^2$ | 1 | 20 |
| $(106/15)^2$ | 1 | 19 |
| $(95/15)^2$ | 1 | 18 |
| $(84/15)^2$ | 1 | 17 |
| $(75/15)^2$ | 1 | 16 |
| $(67/15)^2$ | 1 | 15 |
| $(60/15)^2$ | 1 | 14 |
| $(53/15)^2$ | 1 | 13 |

TABLE 1-continued

Example Mapping of Absolute Grant Value
(e.g., with no grant repetition)

| Absolute Grant Value | Rank | Index |
|---|---|---|
| $(47/15)^2$ | 1 | 12 |
| $(42/15)^2$ | 1 | 11 |
| $(38/15)^2$ | 1 | 10 |
| $(34/15)^2$ | 1 | 9 |
| $(30/15)^2$ | 1 | 8 |
| $(27/15)^2$ | 1 | 7 |
| $(24/15)^2$ | 1 | 6 |
| $(19/15)^2$ | 1 | 5 |
| $(15/15)^2$ | 1 | 4 |
| $(11/15)^2$ | 1 | 3 |
| $(7/15)^2$ | 1 | 2 |
| ZERO_GRANT* | N/A | 1 |
| INACTIVE* | N/A | 0 |

The WTRU may be configured with an Absolute Grant Value table similar to the one shown in Table 2 where some of the larger Absolute Grant Values are repeated with a different rank value. This approach may allow the network to configure the WTRU with the same grant but with a different rank.

TABLE 2

Example Mapping of Absolute Grant Value
(e.g., with grant repetition)

| Absolute Grant Value | Rank | Index |
|---|---|---|
| $(168/15)^2 \times 6$ | 2 | 31 |
| $(150/15)^2 \times 6$ | 2 | 30 |
| $(168/15)^2 \times 4$ | 2 | 29 |
| $(168/15)^2 \times 6$ | 1 | 28 |
| $(150/15)^2 \times 6$ | 1 | 27 |
| $(168/15)^2 \times 4$ | 1 | 26 |
| $(150/15)^2 \times 4$ | 1 | 25 |
| $(134/15)^2 \times 4$ | 1 | 24 |
| $(119/15)^2 \times 4$ | 1 | 23 |
| $(150/15)^2 \times 2$ | 1 | 22 |
| $(95/15)^2 \times 4$ | 1 | 21 |
| $(168/15)^2$ | 1 | 20 |
| $(134/15)^2$ | 1 | 19 |
| $(106/15)^2$ | 1 | 18 |
| $(84/15)^2$ | 1 | 17 |
| $(75/15)^2$ | 1 | 16 |
| $(67/15)^2$ | 1 | 15 |
| $(60/15)^2$ | 1 | 14 |
| $(53/15)^2$ | 1 | 13 |
| $(47/15)^2$ | 1 | 12 |
| $(42/15)^2$ | 1 | 11 |
| $(38/15)^2$ | 1 | 10 |
| $(34/15)^2$ | 1 | 9 |
| $(30/15)^2$ | 1 | 8 |
| $(27/15)^2$ | 1 | 7 |
| $(24/15)^2$ | 1 | 6 |
| $(19/15)^2$ | 1 | 5 |
| $(15/15)^2$ | 1 | 4 |
| $(11/15)^2$ | 1 | 3 |
| $(7/15)^2$ | 1 | 2 |
| ZERO_GRANT* | N/A | 1 |
| INACTIVE* | N/A | 0 |

The WTRU may be configured with a threshold value for the absolute grant. When the WTRU receives an Absolute Grant Value index below the threshold, the WTRU may assume rank-1, otherwise (e.g., when the WTRU receives an Absolute Grant Value index equal to or above the threshold) the WTRU may assume rank-2.

A WTRU may be configured with a special E-RNTI, e.g., for the secondary stream control. For example, the WTRU may receive a special E-RNTI. The special E-RNTI may be associated with the E-AGCH-like channel. For example, the special E-RNTI may be associated with the E-AGCH-like channel, while the E-RNTI may be associated with the E-AGCH. As noted herein, the E-AGCH-like channel may be associated with a transmit rank indication and/or secondary stream power offset (e.g., potentially in addition to other dual-stream operations transmission parameters). The WTRU may receive the E-AGCH-like channel, and determine that the E-AGCH-like channel is associated with the special E-RNTI (e.g., by decoding the E-AGCH-like channel). For example, upon receiving the E-AGCH-like channel, the WTRU may decode the E-AGCH-like channel. After decoding the E-AGCH-like channel, the WTRU may perform a cyclic redundancy check (CRC) on the decoded E-AGCH-like channel (e.g., utilizing the special E-RNTI) to confirm that the decoded channel is in fact the E-AGCH-like channel. The WTRU may determine the transmit rank indication and/or a secondary stream power offset, for example, upon determining that the E-AGCH-like channel is associated with the special E-RNTI. The WTRU may apply (e.g., be configured with) the transmit rank indication and/or secondary stream power offset.

The special E-RNTI may include an identity associated with the E-AGCH-like channel, e.g., via RRC configuration. For example, the WTRU may receive a configuration for the E-AGCH-like channel (e.g., via an Information Element (IE) over RRC (e.g. "E-ROCH Info FDD" IE)) that may include, for example, the E-AGCH-like channel associated channelization code (e.g., "Channelization code" IE) and the E-AGCH-like channel E-RNTI (e.g., "E-ROCH E-RNTI" IE). The special E-RNTI (e.g., the E-AGCH-like channel E-RNTI) may take a different value than other E-RNTIs (e.g., "New Primary E-RNTI" and "New Secondary E-RNTI" IEs), in which case, for example, the E-AGCH-like channel associated channelization code may be the same as the E-AGCH channelization code. The special E-RNTI (e.g., the E-AGCH-like channel E-RNTI) may take the same value as another E-RNTI (e.g., "New Primary E-RNTI" or "New Secondary E-RNTI" IEs), in which case, for example, the E-AGCH-like channel associated channelization code may be different than the E-AGCH channelization code.

When detecting the special E-RNTI associated with the E-AGCH-like channel, the WTRU may determine that the E-AGCH-like channel controls the secondary stream and decode the E-AGCH-like channel accordingly (e.g., according to a new format or new fields). The channel may be referred to as the E-DCH Secondary Control Channel (E-SCCH), but is not limited to such a name. A special field in the E-SCCH may be used to carry the TRI. The WTRU may receive the E-SCCH and then apply the TRI as received.

Systems, methods, and instrumentalities for implicit rank indication and/or determination may be disclosed. For implicit rank determination, the WTRU may be configured with a rank control timer that may be started, for example, when the transmission rank changes from 1 to 2 (e.g., via an indication from a NodeB). When the timer expires, the WTRU may, for example, revert to rank-1 transmission. At a high level this may be characterized by components: triggers to start the timer, triggers to reset the timer, triggers to early timer termination and actions upon timer expiry or termination. Examples of the components may include one or more of the following.

An exemplary trigger to start the timer may include one or more of the following. The WTRU may receive an explicit transmission rank indication. The WTRU may receive an explicit transmission rank indication changing the rank from 1 to 2. The WTRU may determine that the new rank is 2 and autonomously changes the transmission rank from 1 to 2. The WTRU may receive an aperiodic transmission rank indication (e.g., signaled over a L1 shared channel or over L2). The WTRU may receive an aperiodic transmission rank indication (e.g., signaled over a L1 shared channel or over L2) changing the rank from 1 to 2.

An exemplary trigger to reset the timer (e.g., and continue) may include one or more of the following. The WTRU may transmit using rank 2. The WTRU may receive an indication to continue rank-2 transmission.

An exemplary trigger for early termination (e.g., the WTRU further stops and reset timer) may include one or more of the following. The WTRU may be configured for rank-2 transmission but transmit with rank-1 (e.g., because of the buffer). The WTRU buffer may be empty. The WTRU may stop transmission of E-DCH (e.g., the buffer is empty). The WTRU may receive a grant that no longer allows for rank-2 transmission.

Exemplary actions upon timer expiration or early termination may include one or more of the following. The WTRU may stop and reset the timer. The WTRU may revert to transmission rank 1. The WTRU may indicate the transmission rank change to the network.

Figure 3:
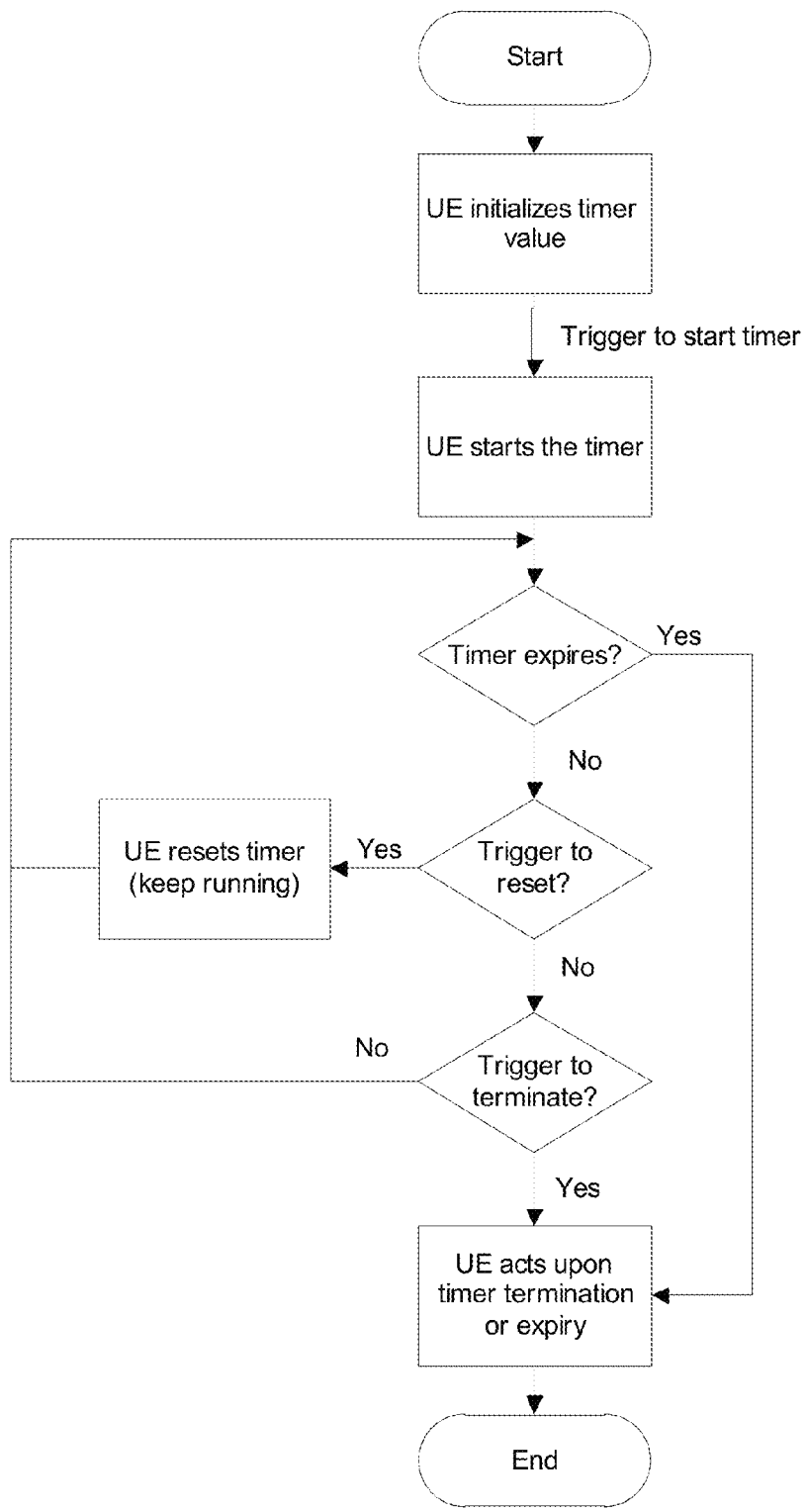
FIG. 3 shows an example of the rank control timer.

The WTRU may be configured with a value for the timer, for example, via RRC signaling. The timer may be initialized with a configured value. The WTRU may start the timer when the WTRU detects one of the configured triggers. FIG. 3 shows an example of the rank control timer, which provides an example of the relation between the triggers and WTRU actions.

Systems, methods, and instrumentalities for dynamic secondary stream rate and power may be disclosed. Controlling the E-DCH when the WTRU is configured for UL MIMO operations may be described. The WTRU serving grant may be controlled by the network via a combination of absolute and relative grants. While the relative grants may be sent using an L1 dedicated channel (e.g., E-RGCH), the absolute grant and associated control may be sent using a shared channel, for example, the E-AGCH. A WTRU in E-DCH may be configured to monitor the E-AGCH. When the WTRU detects one of the configured E-RNTI on the E-AGCH, the WTRU may apply the associated control message according to a specific set of rules (e.g., Section 11.8.1.3 in 25.321 v10.5.0). The WTRU may be configured to monitor for a Primary E-RNTI and may be configured to monitor for a Secondary E-RNTI. If configured to do so, the WTRU may maintain a primary serving grant (e.g., controlled by the Primary E-RNTI) and secondary serving grant (e.g., controlled by the Secondary E-RNTI). The rules for the serving grant, HARQ process activation, etc., may be different for the Primary and Secondary E-RNTI. The network may use the Primary E-RNTI and associated grant to control one WTRU at a time, for example in high-load situations to optimize the transmission for that WTRU. The network may use the Secondary E-RNTI to control a group of WTRUs (e.g., in that case the Secondary E-RNTI may be common to a group of WTRUs).

The WTRU may be configured in one of two operation states. In a first state, the WTRU may apply the Primary serving grant, and in the second state the WTRU may apply the Secondary serving grant. The specifications may provide signaling and rules for changing from one state to the other.

In the context of UL MIMO or dual stream operations, the network may control the total WTRU transmit power (e.g., via the serving grant) to control the total interference, and it may control the WTRU secondary stream parameters such as power and data rate to adapt to varying channel conditions. The network may control the dual-stream operations transmission parameters.

Figure 4:
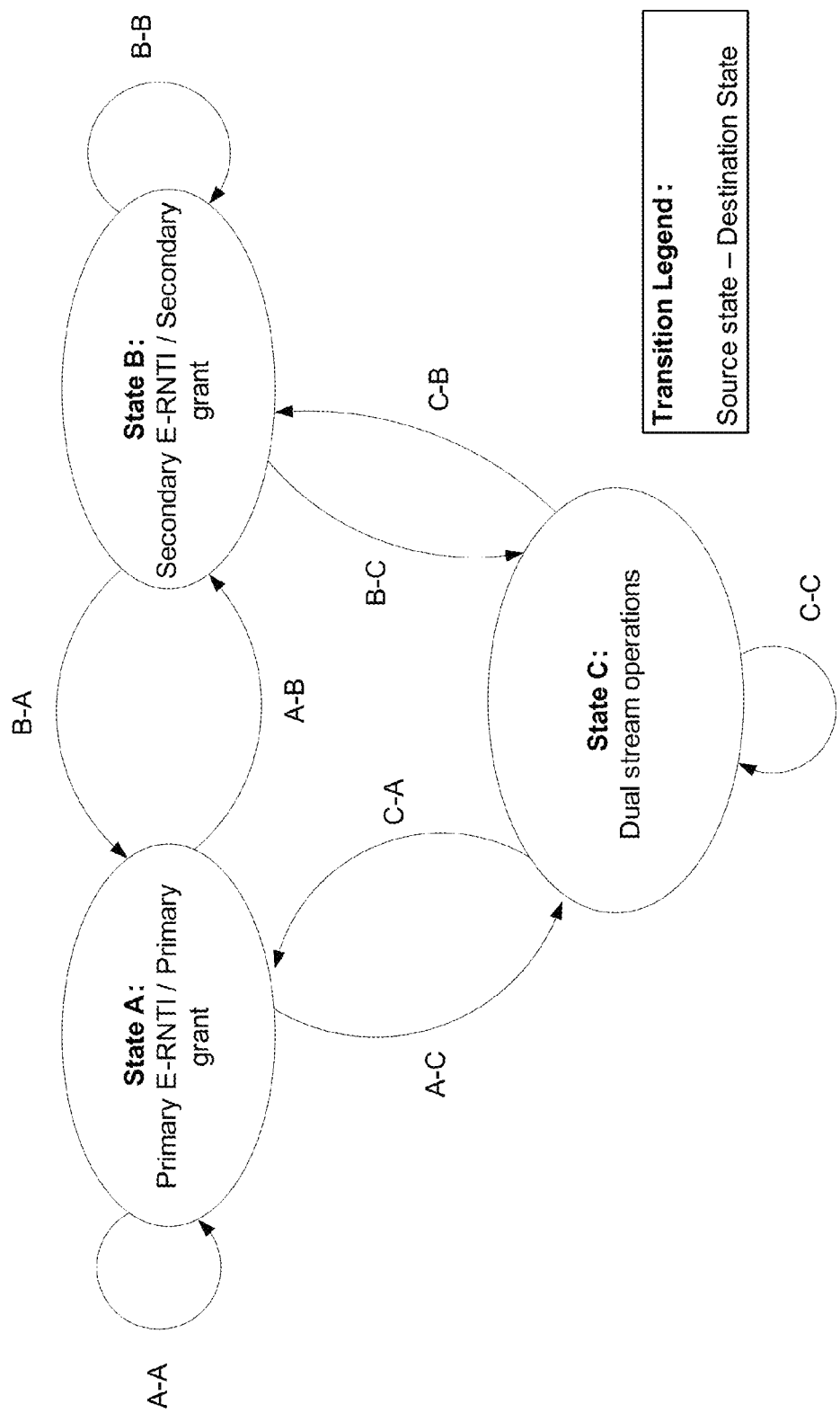
FIG. 4 shows an WTRU E-DCH operation state diagram.

Systems, methods, and instrumentalities for dual-stream E-DCH state operations may be disclosed. For control of dual-stream operations transmission parameters, when the WTRU is configured with dual-stream operations or UL MIMO operations, the E-DCH may be operated with a new state. FIG. 4 provides an exemplary WTRU E-DCH operation state diagram, where State A and State B correspond to the conventional E-DCH state for primary and secondary grant operation, respectively, and State C is a new state for dual stream operations. Transitions from one state to the other are labeled in FIG. 4 with the "Source state—Destination state" terminology.

Triggers for the WTRU to transition from one state to the other may be described and may include other WTRU related actions. Note that to simplify the description, the triggers are described in the context of a specific state transition; however it should be understood that the triggers may apply to other state transitions.

Transitions to State C, e.g., entering dual-stream operations, may be disclosed. Exemplary transitions are illustrated in FIG. 4, e.g., A-C and B-C. While descriptions are provided for transitions from state A and B, the WTRU may be configured such that some triggers may be limited to when the WTRU is in one of the states.

The WTRU may be configured to transition to a dual-stream operation state, e.g., State C, when it receives an indication from the serving NodeB (e.g., which may assume that the WTRU is already configured for UL MIMO operations).

The WTRU may be configured (e.g., initially) by higher layers with a Tertiary E-RNTI. The Tertiary E-RNTI may be used for the control of dual-stream operations. The WTRU may receive a Tertiary E-RNTI on an E-AGCH. When the WTRU decodes its Tertiary E-RNTI on the E-AGCH, the WTRU may transition to State C. When the WTRU decodes its E-AGCH-like E-RNTI (e.g., or special E-RNTI or E-ROCH E-RNTI), the WTRU may transition to State C.

The WTRU may be configured with a second E-AGCH channelization code to monitor or an alternative (e.g., new) shared channel designed for the control of secondary stream and for example based on the E-AGCH (e.g., the E-AGCH-like channel or E-ROCH). The WTRU may monitor this additional shared channel. When the WTRU detects its E-RNTI (e.g., Primary, Secondary, or Tertiary E-RNTI), for example on this channel, the WTRU may transition to State C.

The WTRU may be configured to transition to State C upon reception of a special combination of E-RNTI, Absolute Grant Scope, and Absolute Grant Value on the E-AGCH. For example, the WTRU may be configured with a new Absolute Grant Value table which may include a reserved value (e.g., "UL-MIMO"). When the WTRU detects its E-RNTI (e.g., the Primary E-RNTI or the Secondary E-RNTI) on the E-AGCH and the Absolute Grant Value is equal to "UL-MIMO," the WTRU may transition to State C. The WTRU may be configured to transition to State C when it also receives a specific value for the Absolute Grant Scope (e.g., "Per HARQ process" or "All HARQ processes").

Additional rules and conditions for transitions to State C may be defined and may be implemented alone or in combination the other rules disclosed herein. The following are examples.

The WTRU may be configured to be limited to transitioning to State C from a specific state, for example from State A. The WTRU may be configured to be limited to transitioning to State C when the "Primary_Grant_Available" variable is set to "True."

Upon transition to State C, the WTRU may perform one or more of the following actions. The WTRU may reset and start a timer for State C. The WTRU transitions back to the previous state upon timer expiry. The WTRU applies control information (e.g., dual-stream operation transmission parameters) carried on the E-AGCH. The WTRU uses the last received or last saved value of total serving grant and secondary stream power offset or grant. The WTRU changes its rank to 2. The WTRU applies default or pre-configured dual-stream operation transmission parameters.

Transitions from dual stream operations may be disclosed. In a first method the WTRU is configured to transition out of dual-stream operation state (from State C to States A or B) when it receives an explicit indication from the serving NodeB.

The WTRU may be configured to transition to State A upon reception of the WTRU Primary E-RNTI on the E-AGCH. The WTRU may transition to State A in the instance when in addition to the WTRU Primary E-RNTI on the E-AGCH, both the value of the Absolute Grant Value is different than "INACTIVE" and the Absolute Grant Scope value is "All HARQ Processes," which may maintain the rules for transitioning to State B.

The WTRU may be configured to transition to State B when the WTRU receives the Primary E-RNTI on the E-AGCH, the Absolute Grant Value is set to "INACTIVE," and the Absolute Grant Scope is set to "All HARQ Processes" and the WTRU is configured with a Secondary E-RNTI. The WTRU may be configured to monitor another E-AGCH or other new shared channel. The WTRU may monitor its E-RNTI on the channel (e.g., Primary, Secondary or Tertiary E-RNTI). Upon detections of its E-RNTI on the channel and a special combination of values carried on the channel, the WTRU may transition to State A or B. The actual destination state may be indicated by the value carried in the control channel.

The WTRU may be configured to transition to State A upon reception of an E-AGCH carrying the WTRU Tertiary E-RNTI and a special value of the Absolute Grant Value and/or Absolute Grant Scope (e.g., UL-MIMO, as described herein). The WTRU may be configured to transition to State A when it also receives a specific value for the Absolute Grant Scope (e.g., "All HARQ processes", or "Per HARQ process"). This approach may be used, for example, if different values for the Absolute Grant Scope for entering and exiting State C are chosen (e.g., "Per HARQ Process" to enter State C and "All HARQ processes" to exit State C, or the other way around).

The WTRU may be configured to exit State C to State A when a timer expires. For example, a new timer for State C may be configured; the timer may be started when entering State C and upon expiration the WTRU may autonomously returns to State A. The value of the timer may be configured by the network, fixed in the specifications, etc.

Upon exiting State C, the WTRU may perform one or more of the following actions. The WTRU may stop the State C related timer. The WTRU may maintain the total grant as a serving grant for operations in State A (e.g., the value of the Serving_Grant for operations in State A may be set to the value of the total grant used for State C). The WTRU may reset the rank to 1. The WTRU may reset the value of the secondary stream parameter (e.g., as defined herein) or grant to zero or a default/configured value. The WTRU may store the grant information and secondary stream parameters in a variable. The WTRU may perform one or more actions related to HARQ process and buffer management, for example, as described herein.

WTRU actions related to control of secondary stream parameters for dual-stream operations (e.g., when the WTRU is in State C as described in the previous Sections) may be disclosed. Note that the transmission rank may be independently configured by the NodeB using one of the method described above, e.g., the methods described below may be used in combination to those described above for rank control.

For dual-stream operations, the WTRU may be configured with a number of transmission parameters. For example, the WTRU may be configured with a serving grant that accounts for the WTRU total transmission (e.g., may be referred to as total grant, total serving grant, etc.), and one parameter controlling the secondary stream rate. This parameter may represent a data rate, a power offset, an SNR difference, or other parameter that may be linked to a data rate or power. This secondary stream parameter may be referred to as the secondary stream parameter.

The WTRU may store the values for the total serving grant and secondary stream parameter, for example, in two variables. The WTRU may then update the variable as it receives new values from the network. The WTRU may store the total serving grant in the variable for serving grant (e.g., Serving_Grant). The same variable may be used in both State A and State C. From a NodeB perspective, interference that may be caused by a WTRU may originate from both streams and for interference control purposes the NodeB may control the total WTRU E-DPDCH power regardless of the number of streams being transmitted.

A WTRU may receive dual-stream operation parameters (e.g., total grant, transmit rank indication, secondary stream parameters, etc.) as disclosed herein. The WTRU may be configured to receive control information on the E-AGCH and/or the E-AGCH-like channel, which may include a modified set of fields and multiplexing. The WTRU may determine whether or not the E-AGCH and/or the E-AGCH-like channel carries dual-stream operation transmission parameters or the conventional parameters, e.g., based on the channelization code over which the channel is carried. The WTRU may be configured with an E-AGCH and/or an E-AGCH-like channel on a different channelization code to indicate dual-stream operation. The WTRU may monitor for an E-AGCH and/or an E-AGCH-like channel, e.g., on the secondary channelization code. When the WTRU detects its E-RNTI (e.g., the Primary E-RNTI or another configured E-RNTI, for example, the special E-RNTI) on the E-AGCH and/or the E-AGCH-like channel carried on the channelization code, the WTRU may determine that the E-AGCH and/or the E-AGCH-like channel carries dual-stream operations transmission parameters. The WTRU may then decode the information and update the value of the variables.

The WTRU may determine whether or not the E-AGCH and/or the E-AGCH-like channel carries dual-stream operation transmission parameters or the conventional parameters (e.g., associated with single-stream transmission) by using the E-RNTI and/or the special E-RNTI. For example, the WTRU may be configured to monitor for the E-AGCH and the E-AGCH-like channel (e.g., the E-ROCH), which may together be referred to herein as the "control channel," on the same channelization code. The WTRU may be configured with a special E-RNTI or E-AGCH-like channel E-RNTI associated with the E-AGCH-like channel (e.g., E-ROCH). When the WTRU detects the E-AGCH-like channel E-RNTI on the monitored control channel, the WTRU may determine that the received E-AGCH carries dual-stream operations transmission parameters, and the control channel detected is an E-AGCH-like channel. The WTRU may decode the information and update the value of the variables. For example, the control channel carrying the E-AGCH-like channel E-RNTI may carry the secondary stream parameter and may not carry information related to the total grant. Upon receiving the control channel with the E-AGCH-like channel E-RNTI, the WTRU may apply the secondary stream parameter. The control channel carrying the E-AGCH-like channel E-RNTI may carry both the stream parameter and the rank indication. Upon receiving the control channel with the E-AGCH-like channel E-RNTI, the WTRU may, for example, apply the two parameters to the appropriate variables. The WTRU may determine that the control channel carries the E-AGCH when it detects that the control channel carries the E-RNTI (e.g., the Primary E-RNTI or Secondary E-RNTI).

The number of bits on the E-AGCH-like channel may be kept fixed, e.g., to simplify the decoding when using an E-AGCH-like channel E-RNTI. The total number of bits for the total grant and the secondary stream parameter may be limited to 5 if both fields are using the Absolute Grant Value field or 6 if both fields use the Absolute Grant Scope bit. A reduced size field may be used for carrying the total grant. This may be justified as dual-stream operations may utilize relatively large grants to begin with. The NodeB may limit configuration of a WTRU for dual-stream operations when the grant values are large. The WTRU may be configured with a new reduced-size mapping table for the total grant. The mapping table may comprise for example large values of the serving grant and a number of special values. Table 3 shows an example mapping (e.g., requiring 3 bits), for example, where the top entries may be taken from 3GPP TS 25.212 Table 16B.1, and the special lower entries are kept.

TABLE 3

Example Mapping of Absolute Grant Value using a reduced table (3 bits) for total grant in dual-stream operations

| Absolute Grant Value | Index |
|---|---|
| $(377/15)^2 \times 4$ | 7 |
| $(237/15)^2 \times 6$ | 6 |
| $(168/15)^2 * 6$ | 5 |
| $(150/15)^2 * 6$ | 4 |
| $(168/15)^2 * 4$ | 3 |
| $(150/15)^2 \times 4$ | 2 |
| ZERO_GRANT* | 1 |
| INACTIVE* | 0 |

To signal the secondary stream parameter, the WTRU may be configured with a table. It may be assumed that the secondary stream parameter comprises a power offset, for example expressed in dB. Table 4 shows an example of secondary stream parameter (SSP) mapping (e.g., with example values). In this example, the entries may represent a power offset. The "Infinite" value entry may be used by the NodeB to effectively turn off the secondary stream, however, the value entries shown are used as example.

TABLE 4

Example mapping of secondary stream parameter (3 bits)

| Secondary stream power offset (dB) | Index |
|---|---|
| 0 | 7 |
| 1 | 6 |
| 2 | 5 |
| 3 | 4 |
| 4 | 3 |
| 5 | 2 |
| 6 | 1 |
| Infinite* | 0 |

Figure 5:
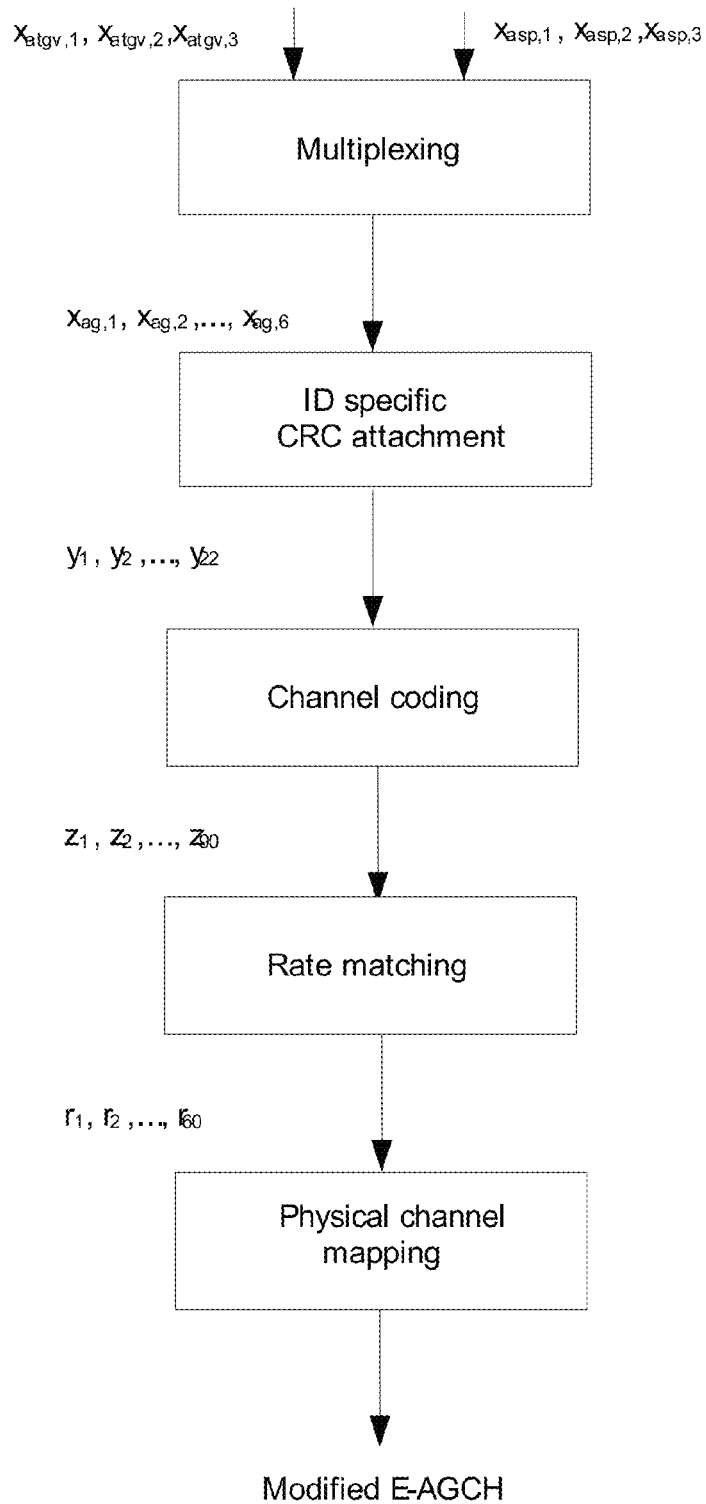
FIG. 5 shows example coding for the shared control channel carrying total grant and secondary stream parameter.

It may be preferable to carry a total of 6 bits on the E-AGCH or an E-AGCH-like channel, for example, which may result in a modified E-AGCH. In an example, 3 bits of the total grant and 3 bits of the secondary stream parameters may be multiplexed together. An example coding for this modified E-AGCH channel is shown in FIG. 5, where the $x_{atgv,1}, \ldots, x_{atgv,3}$ may be the absolute total grant value bits and $x_{asp,1}, \ldots, x_{asp,3}$ may be the bits associated with the secondary stream parameters.

In this example, the Absolute Grant Scope bit may not be carried. The WTRU may be configured to use a pre-defined value. For example, the WTRU may be configured to use or assume the "Per HARQ process" value of the Absolute Grant Scope when receiving the modified E-AGCH in State C or with the Tertiary E-RNTI. The WTRU may be configured to use or assume "All HARQ Processes" value of the Absolute Grant Scope when receiving the modified E-AGCH in State C or with the Tertiary E-RNTI.

Figure 6:
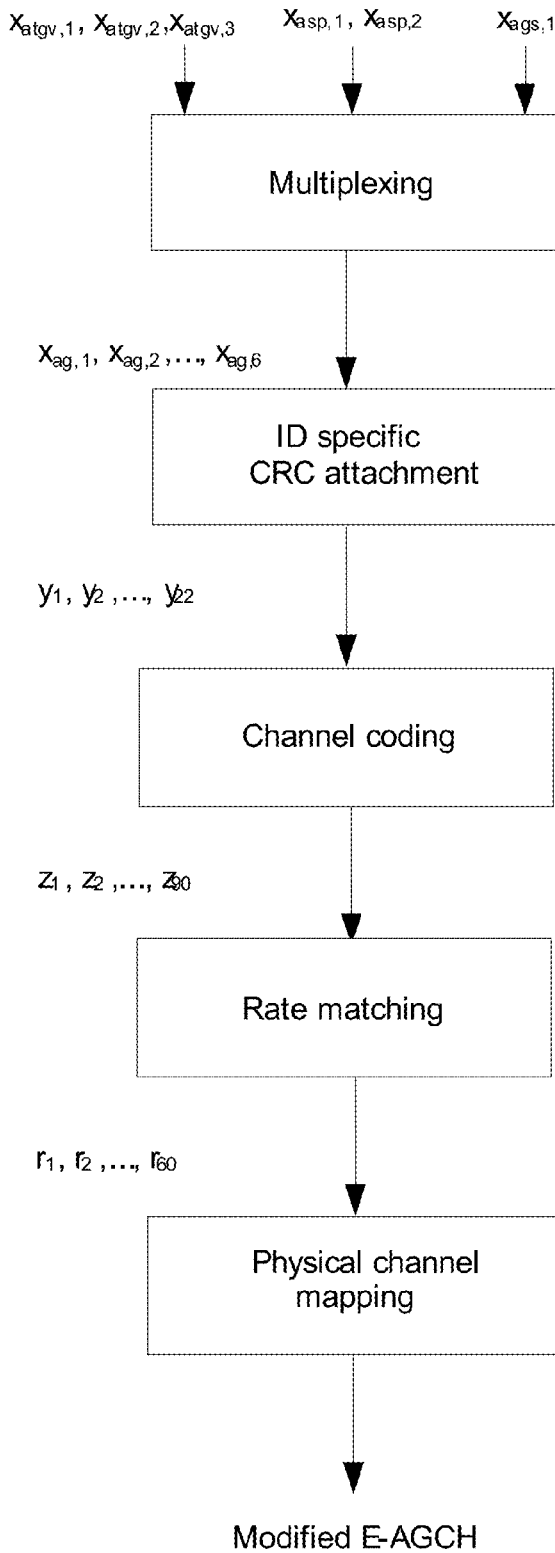
FIG. 6 shows example coding for the shared control channel.

The size of the table may be designed such that the Absolute Grant Scope bit may be carried on the modified E-AGCH. This example is shown in FIG. 6, where 2 bits are used for the absolute secondary stream parameter field.

Controlling the secondary stream parameter using dedicated channels may be disclosed. The WTRU may be configured to monitor a dedicated channel for control of the secondary stream parameter. For example, the WTRU may be configured to monitor an E-RGCH-like channel when configured in State C.

A new E-DCH relative secondary stream control channel (E-RSSCH) channel may carry a 1 bit information, for example similar to the E-RGCH. The E-RSSCH may carry an "UP" or "DOWN" command. Upon reception of an "UP" command from the E-RSSCH the WTRU may update the value of the secondary stream parameter, for example by one step up (e.g., unless the value has already reached the maximum). Upon reception of a "DOWN" command from the E-RSSCH, the WTRU may update the value of the secondary stream parameter, for example by one step down (e.g., unless the value has already reached the minimum).

Dynamic inter-stream interference (ISI) control may be provided. For dual-stream MIMO operations, the NodeB receiver may isolate the two streams and decode them, e.g., to provide additional throughput gains. This may be attempted with the help of multiple receive antennas and advanced signal processing receiver technology together combating the impact of the channel. However, a residual inter-stream interference may be present, which may degrade the receiver performance. This inter-stream interference may impact the secondary stream and/or the primary stream.

Degradation in receiver performance due to inter-stream interference may be measured and/or estimated at the NodeB, e.g., expressed as a signal-to-noise ratio (SNR)

equivalent. For example, a NodeB may determine for a given channel realization that a penalty of 2 dB is incurred due to inter-stream interference.

Mechanisms to mitigate the impact of inter-stream interference may be provided. The mechanisms may include the WTRU being configured with one or more inter-stream interference specific parameters. The WTRU may apply the parameters to adjust its transmission rate accordingly. The parameter(s) signaled may be used by the WTRU to determine a penalty incurred due to inter-stream interference.

A WTRU may determine inter-stream interference control information. A WTRU may be configured with a set of inter-stream interference control parameters. For example, the WTRU may be configured with an inter-stream interference (ISI) offset or penalty, e.g., that the WTRU may apply when transmitting with dual-streams. The ISI offset may be signaled to the WTRU via RRC configuration, fixed in the specifications, etc. For example, a WTRU may receive an ISI offset via RRC signaling, e.g., from the network. The WTRU may apply the ISI offset to an uplink transmission of a primary stream of a dual-stream transmission.

The WTRU may be configured with a set of values parameterizing the ISI offset or penalty to be applied. The WTRU may be configured with these values, for example, via RRC signaling. The WTRU may determine the actual ISI offset to be applied, for example, by using interpolation of the configured parameters, e.g., as disclosed herein.

The WTRU may be configured dynamically by the NodeB with an explicit value for the ISI offset or penalty. This may be implemented, for example, by signaling a separate value for the ISI offset or penalty, e.g., as part of the E-AGCH-like channel. This may be implemented using an indexed table. In an example, the WTRU may be configured (e.g., simultaneously) with at least a secondary stream offset and the ISI offset via the E-AGCH-like channel. The values may be independently coded or jointly coded, e.g., using an index in a table with joint values.

Figure 7:
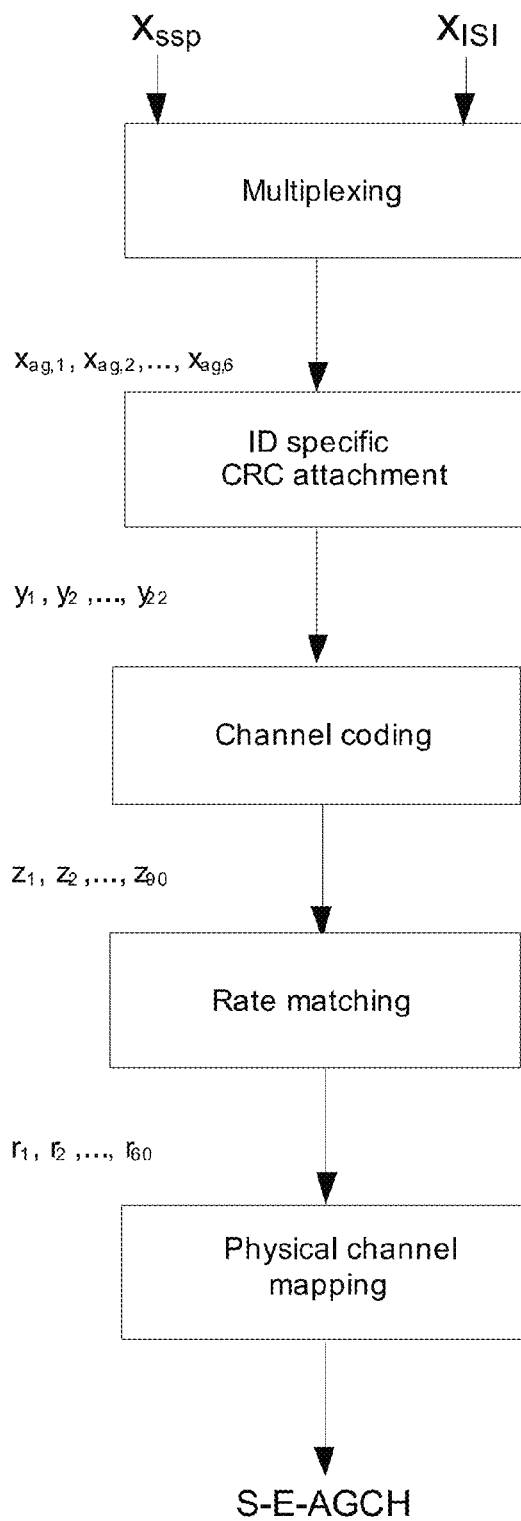
FIG. 7 shows an example of the concept where the secondary stream parameter (SSP) and the ISI parameter are signaled over an E-AGCH-like channel.

FIG. 7 shows an example implementation of signaling the secondary stream parameter (SSP) and the ISI parameter over an E-AGCH-like channel (e.g., an S-E-AGCH, such as, but not limited to an E-ROCH). The S-E-AGCH may include a joint SSP-ISI control channel. The actual number of bits and mapping for each field of the E-AGCH-like control channel such as the S-E-AGCH may take different values. In an example, the SSP field may take 3 bits and may use the mapping as shown in Table 4. The ISI field may take 3 bits and have the mapping shown in Table 5.

TABLE 5

Example mapping of ISI offset (3 bits)

| ISI offset (dB) | Index |
| --- | --- |
| 0 | 0 |
| 1 | 1 |
| 2 | 2 |
| 3 | 3 |
| 4 | 4 |
| 5 | 5 |
| 6 | 6 |
| 7 | 7 |

The WTRU may deduce the ISI offset from a secondary stream offset sent to the WTRU via a secondary grant channel. A strong secondary stream, as compared to the primary, may imply that the two spatial streams can be well separated, e.g., the inter-stream interference may be small. A table at the WTRU may be specified that maps the secondary stream offset to the deduced level of ISI. The Node B may include an ISI offset and secondary stream offset when determining transmissions in the secondary grant channel.

The NodeB may signal an indication of an orthogonality factor, e.g., the orthogonality factor itself, an index to a look-up table corresponding to the orthogonality factor, etc. The indication of the orthogonality factor may be sent with or without the ISI offset parameter (or penalty) to the WTRU. The orthogonality factor $\gamma$ may represent the degree of the orthogonality between the primary and the secondary stream at the NodeB, which may be translated to the ISI between these two streams. For example, it may be assumed that $0 \leq \gamma \leq 1$, where $\gamma=1$ may represent a case where the primary and secondary channels may be orthogonal to one another, which may imply that there may be no ISI. The degree of orthogonality may become lower as $\gamma$ becomes smaller, e.g., the ISI may become significant. The orthogonality factor may be designed in other ways. In an example, the orthogonality factor may take the value $\gamma=0$ to indicate the case where the primary and the secondary channels may be orthogonal, and the value $\gamma=1$ may indicate that they interfere, e.g., fully. The orthogonality factor may be interpreted as a measure of correlation.

The range and the distribution of the orthogonality factor may be suitable for signaling from the NodeB using the finite number of bit fields. Upon receiving the orthogonality factor, the WTRU may calculate a corresponding ISI offset parameter (or penalty) and apply the parameter. For example, the WTRU may calculate the ISI offset parameter based on the orthogonality factor by using one or more of the following example methods.

The WTRU may be configured to determine the ISI parameter based on the orthogonality factor. The WTRU may do so via a look-up table where the orthogonality factor is mapped onto an ISI offset value.

A method for calculating the ISI offset parameter may be ISI E-TFCI-dependent. The ISI compensation may depend on the orthogonality factor and on the E-TFCI candidate. The ISI compensation may be a function of the E-TFCI, or may be a function of the E-DPDCH and/or S-E-DPDCH gain factor. The WTRU may be configured with one or more parameters and/or a function such that the WTRU may determine the amount of ISI compensation (AISI) given the orthogonality factor $\gamma$ and the candidate E-TFCI.

The WTRU may be configured with one or more parameters for ISI determination via RRC signaling. The WTRU may be configured with one or more E-TFCI threshold value(s). The WTRU may receive (e.g., via L1 signaling) the orthogonality factor $\gamma$. The WTRU may determine the ISI compensation for example using an interpolation formula based on the parameters configured.

A method for calculating the ISI offset parameter may be ISI gain factor-dependent. The WTRU may be configured with one or more parameters for ISI determination via RRC signaling. The WTRU may be configured with one or more gain factor threshold value(s). The WTRU may receive (e.g. via L1 signaling) the orthogonality factor $\gamma$. The WTRU may determine an ISI penalty, e.g., in terms of a number of bits for the E-TFCI candidates using for example the conventional gain factors, the orthogonality factor and one or more ISI determination parameters. For example, the WTRU may perform this calculation when the E-TFCI utilizes a gain factor within the range defined by the configured threshold values.

WTRU actions related to inter-stream interference control may be disclosed. When a WTRU is configured to compensate for inter-stream interference, the WTRU may determine the offset or penalty based on the configured or signaled parameters and may apply the offset to the transmission or in calculating the transmission parameters.

The WTRU may be configured to apply compensation for ISI offset when a certain threshold is reached or condition(s) is met. For example, conditions for applying compensation may include one or more of the following. The transport block size or the E-TFCI of the secondary stream may be less than a predetermined threshold and/or the interference generated from the secondary stream to the primary stream may not be severe. In such a case, the ISI offset compensation may not be applied for the primary stream. In an example, the threshold or conditions may be specified in terms of the orthogonality factor. ISI compensation may be applied for TTIs with dual-stream transmission. ISI compensation may be applied when the TBS or E-TFCI on the primary stream is above a pre-configured threshold. ISI compensation may be applied when the primary stream E-DPDCH power is above a pre-configured threshold. ISI compensation may be applied when the primary stream E-DPDCH gain factor is above a pre-configured threshold.

The ISI offset compensation may be executed using one or more of the following. The WTRU may apply the ISI offset or penalty to the primary stream, e.g., of a dual-stream transmission. For example, the WTRU may apply the ISI offset to an uplink transmission of a primary stream of a dual-stream transmission. For example, the WTRU may apply the ISI offset in calculating the gain factor for the E-DPDCH and/or supported set of E-TFCIs. The ISI offset may be applied, for example, in addition to other measures, e.g., the HARQ offset, other parameters, etc. The below equations may illustrate calculating gain factors, e.g., for extrapolation and interpolation formulas (e.g., see 3GPP TS 25.214, V10.5.0) where ΔISI may represent the ISI offset.

$$\beta_{ed,i,harq} = \beta_{ed,ref}\sqrt{\frac{L_{e,ref}}{L_{e,i}}}\sqrt{\frac{K_{e,i}}{K_{e,ref}}}\cdot 10^{\left(\frac{\Delta harq}{20}\right)}\cdot 10^{\left(\frac{\Delta ISI}{20}\right)} \quad (1)$$

$$\beta_{ed,i,harq} = \sqrt{\frac{L_{e,ref,1}}{L_{e,i}}}\cdot \sqrt{\left(\left(\frac{\frac{L_{e,ref,2}}{L_{e,ref,1}}\beta_{ed,ref,2}^2 - \beta_{ed,ref,1}^2}{K_{e,ref,2}-K_{e,ref,1}}\right)(K_{e,i}-K_{e,ref,1})+\beta_{ed,ref,1}^2\right)}\cdot 10^{\left(\frac{\Delta harq}{20}\right)}\cdot 10^{\left(\frac{\Delta ISI}{20}\right)} \quad (2)$$

The WTRU may be configured to apply the ISI offset when calculating dual-stream MIMO transmissions parameters (e.g., gain factors, TBS, etc). The WTRU may be configured to use an ISI offset value of 0 dB for calculating single-stream transmission parameters. The WTRU may use the ISI offset in calculating the gain factors for E-TFC restriction purposes. The ISI offset may be used in an E-TFC selection procedure to determine the number of bits available based on the current grant. For example using the extrapolation formula (e.g., a similar concept may be applied when using the interpolation formula), the number of bits supported by the serving grant ($K_{sg}$) may be expressed as follows:

$$K_{sg} = \left\lfloor K_{e,ref,m}\cdot \frac{Serving\_Grant}{L_{e,ref,m}\cdot A_{ed,m}^2\cdot 10^{\frac{\Delta harq}{10}}\cdot 10^{\frac{\Delta ISI}{10}}}\right\rfloor$$

The WTRU may be configured to apply the ISI offset for the secondary stream. In MIMO operation, the WTRU may be configured with a secondary stream parameter that may, for example, control the rate of the secondary stream compared to the primary stream. In an example, the parameter may comprise an SNR offset. When calculating the secondary stream transmission parameters (e.g., gain factors, power, TBS, etc.), the WTRU may take into account the ISI offset. For example, the WTRU may combine the secondary stream offset parameter with the ISI offset in calculating the gain factor for each E-TFC or TBS. This may be achieved for example by adding both parameters (e.g., in the log-domain), and applying a single parameter as in the above equations with the term ΔISI, which may combine both the secondary stream SNR offset and the ISI offset.

In an example, the WTRU may determine the secondary stream parameter based on extrapolation and interpolation as follows.

$$\beta_{ed,i,harq} = \beta_{ed,ref}\sqrt{\frac{L_{e,ref}}{L_{e,i}}}\sqrt{\frac{K_{e,i}}{K_{e,ref}}}\cdot 10^{\left(\frac{\Delta harq}{20}\right)}\cdot 10^{\left(\frac{\Delta ISI}{20}\right)}\cdot 10^{\left(\frac{\Delta SSP}{20}\right)}$$

$$\beta_{ed,i,harq} = \sqrt{\frac{L_{e,ref,1}}{L_{e,i}}}\cdot \sqrt{\left(\left(\frac{\frac{L_{e,ref,2}}{L_{e,ref,1}}\beta_{ed,ref,2}^2 - \beta_{ed,ref,1}^2}{K_{e,ref,2}-K_{e,ref,1}}\right)(K_{e,i}-K_{e,ref,1})+\beta_{ed,ref,1}^2\right)}\cdot 10^{\left(\frac{\Delta harq}{20}\right)}\cdot 10^{\left(\frac{\Delta ISI}{20}\right)}\cdot 10^{\left(\frac{\Delta SSP}{20}\right)}$$

The ΔISI2 may represent the ISI offset for the secondary stream, and ΔSSP term may correspond to the secondary stream offset, which in this example may be used to compensate for the relative SNR difference between the primary and secondary stream.

One or more of the following may be used for determining the value of the secondary stream ISI offset. For the secondary stream, the ISI offset may take the same value as the one configured for primary stream (e.g., $\Delta ISI = \Delta ISI_2$). The WTRU may be configured with two separate ISI offsets, e.g., one for each stream. The WTRU may be configured with a fixed ISI secondary stream offset. The WTRU may apply the fixed ISI secondary stream offset to the ISI offset of the primary stream. The WTRU may be configured with a secondary stream parameter that may take into account the ISI offset for the secondary stream. In such a case, further action may not be necessary by the WTRU.

In an example, the two parameters $\Delta ISI_2$ and $\Delta SSP$ may be combined into one parameter. The effects of ISI offset and signal difference between the primary and the secondary stream may be represented by a single parameter such as parameter $\Delta SSP'$. The WTRU may calculate the gain factor for the secondary stream using a single parameter as shown in the following example for the extrapolation and interpolation formulas:

$$\beta_{ed,i,harq} = \beta_{ed,ref}\sqrt{\frac{L_{e,ref}}{L_{e,i}}}\sqrt{\frac{K_{e,i}}{K_{e,ref}}}\cdot 10^{\left(\frac{\Delta harq}{20}\right)}\cdot 10^{\left(\frac{\Delta SSP'}{20}\right)}$$

-continued $$\beta_{ed,i,harq} = \sqrt{\frac{L_{e,ref,1}}{L_{e,i}}} \cdot \sqrt{\left(\frac{\frac{L_{e,ref,2}}{L_{e,ref,1}}\beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2} \cdot 10^{\left(\frac{\Delta harq}{20}\right)} \cdot 10^{\left(\frac{\Delta SSP'}{20}\right)}$$

By doing so, the overhead of feedback signaling may be reduced without sacrificing system performance. The concept of having the effect of ISI being absorbed in the SSP parameter may apply to other formulas.

In an example, the gain factors of the primary and secondary streams may not be adjusted according to the ISI offset. The actual uplink transmission rates may be modified by accounting for the ISI loss. For example, the transport block size of the primary stream may be calculated by:

$$K_{e,m,primary} = \lfloor K_{e,m}/10^{\Delta ISI/10} \rfloor$$

where $K_{e,m}$ is the transport block size calcuted according to the serving grant for the primary serving stream, e.g., via formulas specified in 3GPP standards. For the secondary stream, its transport block size may be determined by:

$$K_{e,m,secondary} = \lfloor K_{e,m}/10^{(\Delta ISI + \Delta SSP)/10} \rfloor$$

$K_{e,m}$ may be used in the gain factor calculation, which may be unmodified. $K_{e,m}$ may be calculated for the primary and secondary stream. For example, $K_{e,m}$ may be calculated using the extrapolation formula. A similar concept may be applied using the extrapolation formula. For example, the transport block size of the primary stream may be calculated by:

$$K_{e,m,primary} = \left\lfloor K_{e,ref,m} \cdot \frac{Serving\_Grant}{L_{e,ref,m} \cdot A_{ed,m}^2 \cdot 10^{\frac{\Delta ISI}{10}} \cdot 10^{\frac{\Delta harq}{10}}} \right\rfloor$$

For the secondary stream, the transport block size may be calculated by:

$$K_{e,m,secondary} = \left\lfloor K_{e,ref,m} \cdot \frac{Serving\_Grant}{L_{e,ref,m} \cdot A_{ed,m}^2 \cdot 10^{\frac{(\Delta ISI_2 + \Delta SSP)}{10}} 10^{\frac{\Delta harq}{10}}} \right\rfloor$$

In the example above, Serving_Grant is used as an example; other gain ratios may be used such as the E-DPDCH gain factors (e.g., expressed as a power ratio).

A non-linear correction to the transport block size calculation may be provided, which for example, may account for inter-stream interference that may not degrade the uplink transmission to the same extent, e.g., when interference from other WTRUs is dominant. The impact of ISI as compared to other sources of noise may be larger at higher serving grants because of higher transmit power, and smaller at lower serving grants. As an example, let α represent the amount of correction required to determine the actual transport block size. A table may be designed that non-linearly maps the serving grant (SG) and ΔISI to the TBS correction value α. The design may include one or more of the following. When SG is smaller than a certain value SG0, α=1. This may be because when the noises of other sources are dominant, ISI may not be an influence. When SG is between SG0 and SG1, α may be a monotonically increasing function of SG. When SG is greater than SG1, α may be capped. This may be because when ISI is dominant, further increasing serving grant (e.g., the TX power) may not improve the data rate.

Note that SG0 and SG1 may be defined as function of ΔISI, and so may the function of SG and α when SG is between SG0 and SG1. As result, the TBS may be determined by:
for the primary stream:

$$K_{e,m,primary} = \lfloor K_{e,m}/\alpha \rfloor$$

for the secondary stream:

$$K_{e,m,secondary} = \left\lfloor \frac{K_{e,m}}{\alpha \times 10^{\frac{\Delta SSP}{10}}} \right\rfloor$$

The WTRU may be configured with specific values of SG0, SG1, and α, e.g., via RRC signaling. Non-linear correction to the transport block size calculation may be opted-out for single-stream operations.

The WTRU may be configured to account for the effect of ISI during the E-TFC selection procedure. For example, the WTRU may determine the "Maximum Supported Payload" by using the conventional approach and applying a penalty in terms of number of bits. The penalty may be determined by using one of the approaches described herein. For example, the WTRU may perform the following steps for the primary stream, and/or for the secondary stream. The WTRU may determine the ISI offset for example based on either the E-TFCI associated to the maximum supported payload or based on the gain factor or power associated to the maximum supported payload (Kmsp). The WTRU may calculate the new maximum supported payload taking into account the ISI (Kmsp,isi). For example, the WTRU may use the following formula:
$K_{msp,isi} = \lfloor K_{msp}/10^{\Delta ISI/10} \rfloor$. The WTRU may perform the remaining of the E-TFC selection procedure using the maximum supported payload taking into account the ISI. The WTRU may determine the new ISI, if applicable, based on the actual number of bits to be carried on the E-DPDCH.

The WTRU may determine the actual gain factor to apply on the primary stream by using the gain factor formulas taking into account the ISI. The WTRU may determine whether to transmit a secondary stream. Based on a determination that the WTRU is to transmit a secondary stream, the WTRU may determine the maximum supported payload for the secondary stream based on the S-E-DPDCH gain factor, which may be configured to be equal to the E-DPDCH gain factor. For example, the extrapolation formula, assuming a single penalty parameter (e.g., ΔSSP) for the secondary stream, may take this form:

$$K_{msp,isi,secondary} = \left\lfloor K_{e,ref,m} \cdot \frac{\sum_{k=1}^{K_{MAX}} \left(\frac{\beta_{sed,k}}{\beta_c}\right)^2}{L_{e,ref,m} \cdot A_{ed,m}^2 \cdot 10^{\frac{(\Delta SSP)}{10}} 10^{\frac{\Delta harq}{10}}} \right\rfloor$$

The gain factors for the secondary stream may equal to the gain factors for the primary stream ($\beta_{sed,k} = \beta_{ed,k}$, for k=1 ... Kmax). The WTRU may execute the rest of the E-TFC selection procedure using this calculated value as maximum supported payload (Kmsp,isi,secondary). For example, the WTRU may not re-calculate the gain factors for the S-E-DPDCH and may assume the gain factors for the S-E-DPDCH to equal to the E-DPDCH gain factors.

HARQ control may be disclosed. In the context of dual-stream operations, the WTRU may be configured to transmit up to two transport blocks in a single TTI. The WTRU may use two independent HARQ buffers and processes for each TB. This may lead to two HARQ processes in the same TTI. The HARQ process associated to the primary stream may be referred to as the Primary HARQ process and the HARQ process associated to the secondary stream may be referred to as the Secondary HARQ process. Together, they may be referred to as an Aggregated HARQ process. Both HARQ processes may share the same HARQ process number (e.g., as they may be transmitted during the same TTI). It should be noted that the two HARQ processes may be ACK/NACKed independently or jointly. The WTRU may be configured to retransmit both HARQ processes until both have been ACKed.

HARQ control processes in the context of dual-stream operations may be disclosed. The WTRU may be configured to activate and deactivate Secondary HARQ processes. The Secondary HARQ processes may be considered active in the case when the WTRU is configured for dual-cell operations (e.g., when the WTRU is in State C). The WTRU may apply one or more of the following rules for HARQ process control. The Secondary HARQ process may be activated in the case where the associated Primary HARQ process is activated. When the Primary HARQ process is deactivated (e.g., using the conventional approach), the WTRU may deactivate the associated or paired Secondary HARQ process. Each Secondary HARQ process may be deactivated by the RNC, e.g., via RRC signaling. In such a case the Secondary HARQ process may not be further activated via NodeB control (e.g., via E-AGCH or other L1/L2 messages).

The WTRU may be configured to activate and deactivate a Secondary HARQ process based on a received L1 message, for example, carried on the E-AGCH. For example, the WTRU may activate or deactivate Secondary HARQ processes based on the content of the E-AGCH carrying dual-stream operation transmission parameters (e.g., examples disclosed herein for the WTRU to determine whether or not the E-AGCH carries dual-stream operation transmission parameters). The following triggers and related WTRU actions may be applied by the WTRU.

The WTRU may deactivate the Secondary HARQ Process (e.g., associated to the CURRENT_HARQ_PROCESS number) when one or more of the following triggers are received. A special and pre-determined combination of values received on the E-AGCH. For example, on the E-AGCH carrying dual-stream operation transmission parameters. The grant value received on the associated E-AGCH (e.g., one carrying dual-stream operation) parameters is "INACTIVE" and the Absolute Grant Scope is set to "Per HARQ Process." The above may be conditioned on the associated Primary HARQ process being active. The secondary stream parameter takes on a special value (e.g., "INFINITE" or other reserved value as disclosed herein). The WTRU deactivates the associated Primary stream (e.g., using one of the conventional method).

The WTRU may deactivate each Secondary HARQ process when one or more of the following triggers are received. A special and pre-determined combination of values is received on the E-AGCH, for example on the E-AGCH carrying dual-stream operation transmission parameters. The grant value received on the associated E-AGCH is "INACTIVE" and the Absolute Grant Scope is set to "All HARQ Processes." The secondary stream parameter takes on a special value (e.g., "INFINITE" or other reserved value). The WTRU exits State C (e.g., changes to State A or B). Each Primary HARQ process has been deactivated (e.g., using the conventional method).

The WTRU may activate the Secondary HARQ Process (e.g., associated to the CURRENT_HARQ_PROCESS number) when one or more of the following triggers are received. A special and pre-determined combination of values is received on the E-AGCH; for example on the E-AGCH carrying dual-stream operation transmission parameters. A non-zero grant value is received on the associated E-AGCH (e.g., the E-AGCH carrying dual-stream operation transmission parameters) and the Absolute Grant Scope is set to "Per HARQ Processes." The above may be conditioned on the associated Primary HARQ process being active. If the associated Primary HARQ process is not already activated, the WTRU may activate the associated Primary HARQ process. The secondary stream parameter takes on a special value or a value different than "INFINITE." The WTRU enters State C. The WTRU is in State C and the associated Primary HARQ processes is being activated (e.g., using the conventional method).

The WTRU may activate each Secondary HARQ process when one or more of the following triggers are received. A special and pre-determined combination of values is received on the E-AGCH; for example on the E-AGCH carrying dual-stream operation transmission parameters. A non-zero grant value is received on the associated E-AGCH (e.g., the E-AGCH carrying dual-stream operation transmission parameters) and the Absolute Grant Scope is set to "All HARQ Processes." The above may be conditioned on the having each Primary HARQ process being active (e.g., those that may be activated and are not restricted based on RRC configuration). If not all the Primary HARQ processes are already activated, the WTRU may activate the associated Primary HARQ processes (e.g., those that may be activated and are not restricted based on RRC configuration). The secondary stream parameter takes on a special value or a value different than "INFINITE." The WTRU enters State C. The WTRU is in State C and each Primary HARQ process is being activated (e.g., using the conventional method).

A WTRU supporting dual-stream operations may transition from single-stream to dual-stream operations depending on the traffic and channel conditions. As described herein, a WTRU may be configured to change state and/or transmission rank dynamically, for instance based on network control or buffer state. This may happen, for example, in one or more of these cases. The WTRU changes from State C to State A or B. The WTRU changes its transmission rank from 1 to 2. The WTRU deactivates one or more Secondary HARQ processes. Dual-stream operation is disabled by higher layers (e.g., via RRC). The WTRU may be configured to change state and/or transmission rank when the WTRU may have low amount of data in one or more of buffers, e.g. when the total E-DCH buffer status (TEBS) may be below a pre-configured threshold. The WTRU may be configured to change state and/or transmission rank when the WTRU becomes power-limited, e.g., when additional scaling is being applied to the WTRU, or when the WTRU may have insufficient power to retransmit failed rank-2 transmissions.

Control of the HARQ buffers when the WTRU transmission rank or state is changed may be disclosed. This may include the case where the WTRU is transmitting using dual-stream operation and is then configured to transmit using single-stream.

When the WTRU is configured to change from dual-stream to single stream operation (e.g., for one or more HARQ processes), the WTRU may have on-going dual-stream HARQ processes and/or a number of unfinished transmissions (e.g., Secondary HARQ processes with non-empty buffers). In such cases, the WTRU may perform one or more of the following actions. The WTRU may flush the buffer of the Secondary HARQ Processes. The WTRU may flush the buffer of the Secondary HARQ Process being deactivated. The WTRU may reset the MAC. The WTRU may reconfigure the HARQ buffer memory to re-allocate the memory associated to the Secondary HARQ processes to the Primary HARQ processes. The WTRU MAC layer may indicate the RLC of the transmission failure of the MAC PDU(s) that were in Secondary HARQ Processes and did not complete transmission. The WTRU may save the MAC PDU in the Secondary HARQ Processes in a queue. The WTRU may then transmit the PDUs as new transmissions over the primary stream, e.g., as Primary HARQ Processes become available. The WTRU may wait until each Secondary HARQ Processes has completed before flushing the Secondary HARQ buffers. For example, the WTRU may let each Secondary HARQ Processes finish while not allowing new transmission. When deactivating a single Secondary HARQ Process, the WTRU may wait until the HARQ process has completed before flushing the Secondary HARQ buffer. For example, the WTRU may let the Secondary HARQ Processes finish while not allowing new transmission. The WTRU may flush the buffer for each HARQ process (e.g., Primary and Secondary) for which a Secondary HARQ Process is activated.

The WTRU may be configured to perform one or more of these actions conditioned on the actual trigger that caused the change from dual-stream transmission to single-stream transmission. For instance, the WTRU may be configured to flush the buffer of the Secondary HARQ process that is deactivated when receiving a command for Secondary HARQ process deactivation.

Systems and methods for handling retransmissions in multi-steam operation may be provided. During the course of normal operations, the WTRU may transmit up to two transport blocks in a TTI. For example, the NodeB may not decode both transport blocks (TB), and may issue one or more NACKs to the WTRU requesting retransmission.

In dual-stream HARQ operations, the WTRU may receive a NACK for a stream, and may retransmit on that stream. For example, the WTRU may receive a NACK for a secondary stream, and may retransmit on the secondary stream. When the WTRU receives a NACK for one stream, and an ACK for another stream, the WTRU may determine whether to retransmit on the stream (e.g., only on the stream) for which a NACK is received. For example, suppose the WTRU may receive an ACK for the primary stream and a NACK for the secondary stream. The WTRU may retransmit on the secondary stream (e.g., only on the secondary stream) if the WTRU buffer is empty, the WTRU is power-limited, and/or the WTRU has been configured for rank-1 transmission.

When the WTRU retransmits on the secondary stream, the WTRU may be configured to transmit on the primary E-DPDCH and/or retransmit the secondary E-DPDCH. The WTRU may transmit scheduling information (SI), retransmit ACKed primary TB, and/or transmit (e.g., only transmit) padding bits. For example, the WTRU may be configured to send the SI on the primary stream E-DPDCH, with or without padding. When padding bits are transmitted, the transport format may support dual-stream operations, e.g., 2SF2+2SF4. The WTRU may be configured to retransmit the primary TB, even when the TB has been ACKed by the NodeB. The WTRU may be configured to transmit padding bits on the primary stream E-DPDCH.

When being power-limited, the WTRU may be configured to apply power scaling on the primary stream E-DPDCH before applying power scaling on the secondary stream E-DPDCH (S-E-DPDCH). This configuration may improve the probability of detection at the NodeB.

The WTRU may transmit on a single data stream. For example, the WTRU may transmit via a single data stream when the WTRU is power-limited. For example, the WTRU may receive a NACK on a secondary stream, and may retransmit the secondary TB on the S-E-DPDCH while transmitting with substantially no power on the primary stream E-DPDCH. The WTRU may transmit the secondary TB on the primary stream (e.g., using the primary stream pre-coding vector). The WTRU may move the secondary TB to the primary stream, effectively re-mapping the HARQ process for the secondary stream to the primary stream. Similarly, the WTRU may move the primary stream TB to a secondary stream for retransmission.

Implementations for handling stream remapping may be provided. Stream re-mapping may include retransmitting a TB on a different stream. For example, when the primary stream is ACKed and the secondary stream is NACKed, the WTRU may retransmit the NACKed secondary stream TB on the primary stream. The NACKed secondary stream TB may be retransmitted using the primary stream pre-coding vector. For example, when the secondary stream is ACKed and the primary stream is NACKed, the WTRU may retransmit the NACKed primary stream TB on the secondary stream. The NACKed primary stream TB may be retransmitted using the secondary stream pre-coding vector.

The WTRU may indicate stream remapping to the NodeB. For example, the WTRU may transmit a value on the E-DPCCH indicating stream remapping. The WTRU may be configured to transmit a reserved value of the E-DCH Transport Format Combination Identifier (E-TFCI), an E-TFCI and Retransmission Sequence Number (RSN) of the secondary TB, a reserved value of the RSN, a special value of the happy bit, and/or a combination of a specific value of E-TFCI, RSN and/or happy bit.

For example, the WTRU may transmit a special value for the E-TFCI for indicating stream remapping rather than the actual E-TFCI being carried on the E-DPCCH. The WTRU may transmit the RSN associated with the secondary TB on the primary stream E-DPCCH. The WTRU may be configured to transmit the actual E-TFCI for the secondary TB and RSN associated with the secondary TB on the S-E-DPCCH.

For example, the WTRU may transmit a special value or combination of the E-TFCI, RSN, and/or the happy bit on the S-E-DPCCH. The WTRU may transmit the actual E-TFCI and RSN for the secondary TB on the E-DPCCH. For example, the WTRU may transmit the E-TFCI and RSN associated to the secondary TB and happy bit on the E-DPCCH and the S-E-DPCCH simultaneously.

For example, the WTRU may implicitly indicate stream remapping to the NodeB. The WTRU may transmit the E-TFCI and RSN of the secondary TB on the primary stream E-DPCCH. The WTRU may not transmit the S-E-DPCCH. The WTRU may transmit the E-TFCI and RSN information associated with the secondary TB on the E-DPCCH. The NodeB may determine that a stream remapping has occurred based on the E-TFCI on the E-DPCCH. For example, when the E-TFCI corresponds to the E-TFCI on the secondary stream in the previous transmission and the RSN is incremented appropriately (e.g., different than zero), the NodeB may determine that a stream remapping has occurred.

For example, the WTRU may use a reserved value of the RSN when retransmitting a secondary TB on the primary stream. The WTRU may transmit with RSN=3. The primary stream HARQ may not use that reserved RSN value (e.g., 3). For example, the WTRU may use a reserved value of the happy bit for indicating stream remapping. The WTRU may transmit the happy bit on the E-DPCCH and/or S-E-DP-CCH.

When the WTRU applies stream re-mapping, the WTRU may be configured to not issue a transmission on the secondary stream until the re-mapped TB has been ACKed and/or the maximum number of HARQ retransmissions has been reached.

The WTRU may be configured to re-calculate transmission parameters for the re-mapped TB(s). For example, the WTRU may re-calculate the transmit power needed and/or the transport format based on data being carried on a different stream. The WTRU may apply the rules for single-stream operations to determine the transmission parameters based on the secondary stream transport block size (TBS).

The WTRU may autonomously control transmission rank and secondary power offset. For example, the WTRU may autonomously adapt to the secondary stream power offset based on the received HARQ ACK/NACK. The WTRU may autonomously notify the NodeB of transmission rank.

Systems and methods for dynamic control of modulation and transmission schemes may be provided. In an example, it may be assumed that a WTRU is configured for 64QAM operations on the uplink. The WTRU may be configured with an associated transport block size table supporting 64QAM.

Activation and deactivation of 64QAM operations may be provided. Actions that may be taken in relation to activation/deactivation of 64QAM may be provided. Combinations of the operations and actions may be used.

Triggers to activate and deactivate 64QAM operations may include one or more of the following. An HS-SCCH order may be used. The WTRU may be configured to receive an HS-SCCH order for activation and deactivation of 64QAM operations. HS-SCCH order(s) may be designed for such activation and deactivation. Grant-based methods may be used. The WTRU may be configured to monitor one or more absolute-grant (E-AGCH) or E-AGCH-like channels for the control of uplink transmission. The following examples are illustrative. The WTRU may deactivate 64QAM operations when the WTRU receives an absolute grant below a preconfigured level. The WTRU may activate 64QAM operations when it receives an absolute grant above a preconfigured level. A special value of the absolute grant or a special combination of values carried on the E-AGCH may be used to indicate activation and/or deactivation of 64QAM operations. L2/MAC control may be used. The WTRU may be configured to receive L2/MAC control messages to activate and/or deactivate 64QAM operations. For example, a MAC-ehs header may be created to carry L2/MAC message(s).

Actions upon reception of an activation and/or deactivation message may include one or more of the following. Upon reception of a 64QAM activation message, the WTRU may perform one or more of the following actions: wait until current active HARQ processes are complete; start initiating transmission with 64QAM support; change the transport block size table to a table supporting 64QAM, which may include one or more of changing the table for the new HARQ transmissions, keeping non-64QAM table HARQ transmission on-going, changing the table for new transmissions and retransmissions, flush the HARQ buffer, etc. Upon reception of a 64QAM deactivation message, the WTRU may perform one or more of the following actions: wait until current active HARQ processes are complete; stop initiating 64QAM transmissions; stop 64QAM transmissions and on-going retransmissions; flush the HARQ buffer; change the transport block size table to the non-64QAM table; etc.

As an example, these actions or a combination of these actions may be performed when the WTRU is reconfigured via RRC signaling to enable and/or disable 64QAM operations. These actions or a combination of these actions and above triggers may also be performed for the activation and deactivation of UL MIMO and/or joint UL MIMO and 64QAM operations.

As described herein, implementations may relate to a WTRU that may determine rank, offset, and/or inter-stream interference control information, for example, which may be associated with uplink MIMO operations. The WTRU may include a processor that may be configured to receive a special E-RNTI. The special E-RNTI may be associated with a channel. The channel may be associated with a rank indication. The channel may be an E-AGCH-like channel. For example, the E-AGCH-like channel may be an E-ROCH.

Encoding of the E-AGCH-like channel may be related to E-AGCH encoding. The E-AGCH-like channel may have a similar encoding structure as an E-AGCH channel. For example, the E-AGCH-like channel may have a similar (e.g., the same) encoding chain (e.g., same number of bits, etc.) as an E-AGCH. The fields of the E-AGCH-like channel may be different from the fields of the E-AGCH. For example, the fields of the E-AGCH-like channel may include secondary stream parameters, such as but not limited to, the transmit rank indicator, secondary stream power, secondary stream power offset, secondary stream rate, etc.

The processor may be configured to receive the channel and determine that the channel is associated with the special E-RNTI. For example, the WTRU may monitor the special E-RNTI to determine if it is associated with an E-AGCH or an E-AGCH-like channel. The processor may be configured to determine at least one of a rank or an offset. The rank may be a transmit rank indication. The rank may indicate a maximum allowable number of MIMO layers. For example the rank may indicate a maximum allowable number of MIMO layers that may be utilized by the WTRU in dual-stream transmissions. A transport block size of a secondary stream of a dual-stream transmission may be determined using the offset. For example, the offset may indicate a penalty that the WTRU may apply in a calculation of the secondary stream transport block size. The processor may be further configured to configure the WTRU with the determined rank or offset.

The processor may be configured to decode the channel to determine that the channel is associated with the special E-RNTI. For example, the processor may be configured to decode the channel, perform a cyclic redundancy check (CRC) on the decoded channel utilizing the special E-RNTI, and determine that the channel is associated with the special E-RNTI. A CRC may be utilized to ensure that the data on E-AGCH-like channel is received correctly. For example, the CRC may be utilized to detect the presence of an error in the received data.

The processor may be further configured to receive an inter-stream interference (ISI) offset, for example, via RRC signaling. The processor may be further configured to apply the ISI offset to an uplink transmission of a primary stream of a dual-stream transmission. For example, the WTRU may apply the ISI offset to the primary stream to change the data that may be sent on the primary stream in an uplink transmission. For example, since the secondary stream offset may be applied to the secondary stream, the ISI may not be applied to the secondary stream.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method to control a wireless transmit receive unit (WTRU), the method comprising:
   receiving an enhanced radio network temporary identifier (E-RNTI) and a special E-RNTI, wherein the E-RNTI is associated with an enhanced absolute grant channel (E-AGCH) and the special E-RNTI is associated with an enhanced rank and offset channel (E-ROCH), the E-ROCH comprising a rank indication;
   receiving the E-ROCH;
   determining that the E-ROCH is associated with the special E-RNTI; and
   determining a rank based on the rank indication, wherein the rank indication indicates a maximum allowable number of multiple-input and multiple-output (MIMO) layers for transmission.

2. The method of claim 1, wherein encoding of the E-ROCH is related to E-AGCH encoding.

3. The method of claim 2, wherein the E-ROCH has the same encoding chain as an E-AGCH.

4. The method of claim 1, wherein determining that the E-ROCH is associated with the special E-RNTI comprises decoding the E-ROCH.

5. The method of claim 1, wherein determining that the E-ROCH is associated with the special E-RNTI comprises:
   decoding the E-ROCH, performing a cyclic redundancy check (CRC) on the decoded E-ROCH utilizing the special E-RNTI, and determining that the E-ROCH is associated with the special E-RNTI.

6. The method of claim 1, further comprising:
   determining an offset; and
   determining a transport block size of a secondary stream of a dual-stream transmission using the offset.

7. The method of claim 6, further comprising:
   determining a transport block size of a secondary stream of a dual-stream transmission using the offset.

8. The method of claim 1, further comprising configuring the WTRU with the determined rank.

9. The method of claim 1, further comprising receiving an inter-stream interference (ISI) offset.

10. The method of claim 9, wherein the ISI offset is received via radio resource control (RRC) signaling.

11. The method of claim 9, further comprising applying the ISI offset to an uplink transmission of a primary stream of a dual-stream transmission.

12. A wireless transmit receive unit (WTRU) comprising:
    a processor configured to:
       receive an enhanced radio network temporary identifier (E-RNTI) and a special E-RNTI, wherein the E-RNTI is associated with an enhanced absolute grant channel (E-AGCH) and the special E-RNTI is associated with an enhanced rank and offset channel (E-ROCH), the E-ROCH comprising a rank indication;
       receive the E-ROCH;
       determine that the E-ROCH is associated with the special E-RNTI; and
       determine a rank based on the rank indication, wherein the rank indication indicates a maximum allowable number of multiple-imput and multiple-output (MIMO) layers for transmission.

13. The WTRU of claim 12, wherein encoding of the E-ROCH is related to E-AGCH encoding.

14. The WTRU of claim 13, wherein the E-ROCH has the same encoding chain as an E-AGCH.

15. The WTRU of claim 12, wherein the processor is configured to decode the E-ROCH to determine that the E-ROCH is associated with the special E-RNTI.

16. The WTRU of claim 12, wherein to determine that the E-ROCH is associated with the special E-RNTI, the processor is configured to:
    decode the E-ROCH, perform a cyclic redundancy check (CRC) on the decoded E-ROCH utilizing the special E-RNTI, and determine that the E-ROCH is associated with the special E-RNTI.

17. The WTRU of claim 12, wherein the processor is further configured to determine an offset, and determine a transport block size of a secondary stream of a dual-stream transmission using the offset.

18. The WTRU of claim 17, wherein the processor is further configured to determine a transport block size of a secondary stream of a dual-stream transmission using the offset.

19. The WTRU of claim 12, wherein the processor is further configured to configure the WTRU with the determined rank.

20. The WTRU of claim 12, wherein the processor is further configured to receive an inter-stream interference (ISI) offset.

21. The WTRU of claim 20, wherein the ISI offset is received via RRC signaling.

22. The WTRU of claim 20, wherein the processor is further configured to apply the ISI offset to an uplink transmission of a primary stream of a dual-stream transmission.

* * * * *